United States Patent
Norkin et al.

(10) Patent No.: US 10,158,838 B2
(45) Date of Patent: Dec. 18, 2018

(54) METHODS AND ARRANGEMENTS FOR SUPPORTING VIEW SYNTHESIS

(71) Applicant: Telefonaktiebolaget L M Ericsson (publ), Stockholm (SE)

(72) Inventors: Andrey Norkin, Solna (SE); Thomas Rusert, Stockholm (SE); Martin Pettersson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 492 days.

(21) Appl. No.: 14/413,642

(22) PCT Filed: Jul. 3, 2013

(86) PCT No.: PCT/SE2013/050860
§ 371 (c)(1),
(2) Date: Jan. 8, 2015

(87) PCT Pub. No.: WO2014/011103
PCT Pub. Date: Jan. 16, 2014

(65) Prior Publication Data
US 2015/0215600 A1  Jul. 30, 2015

Related U.S. Application Data

(60) Provisional application No. 61/669,776, filed on Jul. 10, 2012.

(51) Int. Cl.
*H04N 13/00* (2018.01)
*H04N 13/111* (2018.01)
(Continued)

(52) U.S. Cl.
CPC ......... *H04N 13/111* (2018.05); *H04N 13/128* (2018.05); *H04N 13/398* (2018.05); *H04N 2213/003* (2013.01)

(58) Field of Classification Search
CPC ................................................ H04N 2213/003
See application file for complete search history.

(56) References Cited

U.S. PATENT DOCUMENTS

2007/0279412 A1* 12/2007 Davidson ............. H04N 13/026
                                                                345/419
2014/0293028 A1* 10/2014 Nguyen ............. H04N 13/0011
                                                                 348/59

FOREIGN PATENT DOCUMENTS

EP    2 451 164 A1    5/2012

OTHER PUBLICATIONS

"Philips 3D Solutions: "3D interface specifications, white paper", Feb. 15, 2008 (Feb. 15, 2008), pp. 1-29, XP055011405, Retrieved from the Internet: URL:http://www.business-sites.philips.com/shared/assets/global/Downloadable file/Philips - 3D-Interface-White-Paper-13725. pdf [retrieved on Nov. 7, 2011]."*

(Continued)

*Primary Examiner* — Dave Czekaj
*Assistant Examiner* — Berteau Joisil
(74) *Attorney, Agent, or Firm* — Sage Patent Group

(57) ABSTRACT

Arrangements and methods therein for supporting view synthesis. One method is performed by an arrangement which is operable to receive an input video stream comprising an input view associated with a first camera position. The method includes receiving a measure M_D of a maximum difference in depth or disparity value between two pixels in a depth or disparity map representing the depth or disparity information of a video frame of the input view. The method further includes determining a maximal distance d_cam, from the first camera position to a second camera position, based on the received measure; and indicating the determined distance d_cam to a view synthesizer. This can enable the view synthesizer to synthesize a view associated with a (Continued)

second camera position so that disocclusions due to the distance between the first and second camera position may be handled.

30 Claims, 14 Drawing Sheets

(51) Int. Cl.
  *H04N 13/128* (2018.01)
  *H04N 13/398* (2018.01)

(56) References Cited

OTHER PUBLICATIONS

International Search Report, PCT Application No. PCT/SE2013/050860, dated Oct. 28, 2013.
Written Opinion of the International Searching Authority, PCT Application No. PCT/SE2013/050860, dated Oct. 28, 2013.
Written Opinion of the International Preliminary Examining Authority, PCT Application No. PCT/SE2013/050860, dated Jul. 2, 2014.
International Preliminary Report on Patentability, PCT Application No. PCT/SE2013/050860, dated Nov. 21, 2014.
Philips 3D Solutions, "3D Interface Specifications, White Paper", published Feb. 15, 2008, pp. 1-29, XP055011405, retrieved Nov. 7, 2011 from http://www.business-sites.philips.com/shared/assets/global/downloadablefile/Philips-3D-Interface-White-Paper-13725.pdf.
Suzuki et al. "WD on MVC extensions for inclusion of depth maps", ISO/IEC/JTC1/SC29/WG11/N12544, Feb. 2012, 39 pp.

\* cited by examiner

METHODS AND ARRANGEMENTS FOR SUPPORTING VIEW SYNTHESIS

CROSS REFERENCE TO RELATED APPLICATIONS

This application is a 35 U.S.C. § 371 national stage application of PCT International Application No. PCT/SE2013/050860, filed on 3 Jul. 2013, which itself claims priority to U.S. provisional Application No. 61/669,776, filed 10 Jul. 2012, the disclosure and content of both of which are incorporated by reference herein in their entirety. The above-referenced PCT International Application was published in the English language as International Publication No. WO 2014/011103 A1 on 16 Jan. 2014.

TECHNICAL FIELD

The solution described herein relates generally to view synthesis, and in particular to handling of so-called disocclusions, i.e. lack of certain information, when synthesizing a view at a virtual camera position.

BACKGROUND

The area of 3D video (3DTV) is gaining momentum and is touted as the next logical step in consumer electronics, mobile devices, computers and the movies. The additional dimension on top of 2D video offers multiple different directions for displaying the content and improves the potential for interaction between viewers and the content.

The content can be viewed using glasses, e.g. anaglyphic, polarized and shutter, or without glasses, e.g. by using auto-stereoscopic displays. In case of a 2-view auto-stereoscopic display, two slightly different images are shown to the user using a display with a specific optical system such as lenticular lenses or parallax barrier. The viewer needs to position herself in a specific location in front of the device so that different images arrive on her left and right eye respectively, as an "angular cone". An extension to the auto-stereoscopic display is the n-view auto-stereoscopic displays where multiple viewers can experience the stereo effect without glasses. The content may also be viewed by using a face tracking device or some other means for selecting the proper set of views to display.

Stereoscopic displays with two views, e.g. displays with 3D glasses, typically display two views such that the two views that are being observed by the user correspond to a stereo video pair as captured by a stereo camera with a stereo baseline, i.e. distance between cameras, of 6-7 cm, which corresponds to a typical human eye distance.

Auto-stereoscopic multiview displays present a comparably large number of views from slightly different viewing positions at the same time. Those views are displayed simultaneously at slightly different positions. Thus when a user looks at the autostereoscopic multiview display, he/she will see two different views from the range that is being displayed. The view pairs that the viewer gets to see should be such that they provide a good stereoscopic viewing perception. Typically, a good stereoscopic viewing perception is provided if the two views that are being observed by the user correspond to a stereo video pair as captured by a stereo camera with a stereo baseline of 6-7 cm. Typically, auto-stereoscopic multiview displays display a total range of several, e.g. 4, stereo camera baselines, while at the same time presenting a single stereo baseline when a user looks at the display. Hence the user can move within a defined viewing area, without losing the stereoscopic perception.

As becomes apparent from the description of 2-view displays and auto-stereoscopic multiview displays, the latter require displaying a larger range of views, e.g. 4 stereoscopic baselines, than 2-view displays, which display 1 stereoscopic baseline.

The benefits of 3D video come with extra costs for content production, distribution and management. Firstly, the producer needs to record from additional sources which increase the information for compression, transport, wired or wireless, and storage, e.g. file servers, disks, etc. Additionally, there are physical limitations on how many video sources, views, that can be captured. Usually, the number of cameras is 2 or 3, although there are cases where bigger camera rigs, with up to 80 cameras, have been built. Given the predominance of 2-view stereoscopic displays in 3D cinemas and 3DTVs, almost all 3D content is captured such that it suits 2-view stereoscopic displays, i.e. using 1 stereoscopic baseline during capture.

Moreover, there are two forms of interaction: 1) predefined number of existing views, i.e. a finite number, or 2) an arbitrary view, i.e. an infinite number. Case 1 exhibits a jitter effect when we move from one viewing angle to another. This is alleviated in case 2, thanks to synthesis with interpolation or extrapolation of available views.

Among the view synthesis techniques, depth image based rendering (DIBR) has a prominent position. DIBR typically uses two views and their corresponding depth maps. A depth map contains information regarding the distance of objects from the camera and allows for realistic view warping from an existing position into a new one.

Depth maps may be acquired using infra-red depth cameras, computed for computer generated content or derived from one or more texture images (henceforth referred to as textures) using various techniques.

Any system with view synthesis capabilities that relies on a DIBR requires n input views (textures) and m depth maps. Usually $n=m \geq 2$. Due to that constraint it is evident that the bit-rate for 3DTV is higher than for 2D TV. To quantify the added cost we need to take into consideration the resolution of the depth maps (usually similar to the resolution of texture) and their spatial and temporal characteristics. The theoretical bit-rate boundaries for 3DV and $n=m=2$ lies somewhere between 1×-4× the 2D bitrate. But due to the nature of both texture and depth maps the final rate is somewhere between 1.4×-2.5×.

In FIG. 7, two input views, 701 and 702 are used to synthesize a new one, a virtual view or a synthesized view 703. If the synthesized view 703 resulted only from warping the left view 701, then the two gray areas, 704a and 704b, next to the objects in 703 are domains where there is lack of information, so-called disocclusion, i.e. areas which are hidden in the left view, but which appear/are revealed in the synthesized view. In this case, the right view 702 may be used to fill-in the missing details. Otherwise, missing details, i.e. the details that should appear or be disoccluded in a synthesized view, need to be estimated, which can be difficult, e.g. when no information about the missing details is available. This may lead to visual artifacts in the synthesized view.

As becomes apparent from the description above, synthesis of an intermediate view between two views, interpolation, is easier than synthesis of a view left or right from the leftmost or rightmost available view, extrapolation. Extrapolation becomes more difficult the larger the distance of the extrapolated view from the closest reference view, i.e. existing view or input view, used for synthesis.

The above indicates that typical 3D content, produced for 2-view displays, single stereoscopic baseline, has to be extrapolated in order to be displayed on an auto-stereoscopic multiview display, which requires e.g. 4 stereoscopic baselines, which can lead to visual artefacts.

For various reasons the number of input views available for 3DTV needs to be limited. Moreover, in order to achieve the compression ratio mentioned earlier, temporal and spatial redundancies between the textures and depths respectively needs to be removed. This can be achieved in various ways. Multiview video coding (MVC), for example, is capable of reducing spatio-temporal redundancies and also in-between views redundancies. But, some of the redundancies are difficult to eliminate. For example, from the example in FIG. 1, the only part strictly necessary from the right view is the so called "disocclusion area", i.e. the area which is hidden in the left view, but is revealed/visible in the synthesized view.

MVC and texture+depth formats such as multiview plus depth (MVD) do not address the issue of disocclusions directly. These systems are designed with data compression of multiple views in mind. They are not designed to directly reduce redundancies by detecting disocclusions. In both MVC and MVD the resulting disocclusions are treated as holes that need to be filled from respective other views.

MPEG is working on standardizing a 3D video codec (MPEG 3DV) capable of compressing 3D video in the MVD format. The work is divided into several branches, each branch handling the legacy/backwards capability of existing/approaching codecs. These branches are 3DV-AVC, 3DV-MVC and 3DV-HEVC. HEVC is the next generation 2D video codec expected to take the market shares for the upcoming high quality video services including broadcasted Ultra HDTV with 4K resolution.

In order to facilitate the DIBR view synthesis, a number of parameters need to be signalled for the device or programme module that performs the view synthesis. Among those parameters are first of all z near and z far that represent the closest and the farthest depth values in the depth maps for the frame under consideration. These values are needed in order to map the quantized depth map samples to the real depth values that they represent (one of the formulas below). The upper formula is used if all the depth from the origin of the space are positive or all negative. Otherwise, the formula below is used.

$$Z = \frac{1.0}{\frac{v}{255.0} \cdot \left(\frac{1.0}{Z_{near}} - \frac{1.0}{Z_{far}}\right) + \frac{1.0}{Z_{far}}}$$

$$Z = T_z + \frac{1.0}{\frac{v}{255.0} \cdot \left(\frac{1.0}{Z_{near}} - \frac{1.0}{Z_{far}}\right) + \frac{1.0}{Z_{far}}}.$$

These formulas are used for translating quantized depth value to real depth value. Variable v represents luminance value for each pixel in a grey-scale depth image (for 8-bit depth map, between 0 and 255). Tz represents a z component of a translation vector.

Another set of parameters that is needed for the view synthesis are camera parameters. Camera parameters for the 3D video are usually split into two parts. The first part that is called the intrinsic (internal) camera parameters represents the optical characteristics of the camera for the image taken, such as the focal length, the coordinates of the images principal point and the radial distortion. The extrinsic (external) camera parameters, in their turn represent the camera position and the direction of its optical axis in the chosen real world coordinates (the important aspect here is the position of the cameras relative to each other and the objects in the scene). Both internal and external camera parameters are required in the view synthesis process based on usage of the depth information (such as DIBR).

An alternative solution to sending the key cameras is the layered depth video (LDV) that uses multiple layers for scene representation. These layers can be as of: foreground texture, foreground depth, background texture and background depth.

There exist standardized ways of sending the camera parameters to the decoder. One of them is defined in the multi-view video coding (MVC) standard, which is defined in the annex H of the well-known advanced video coding (AVC) standard, also known as H.264. The scope of MVC covers joint coding of stereo or multiple views representing the scene from several viewpoints. The standard eventually exploits correlation between these views of the same scene in order to achieve better compression efficiency comparing to compressing the views independently. The MVC standard also covers sending the camera parameters information to the decoder. The camera parameters are sent as supplementary enhancement information (SEI) message.

Camera parameters are typically sent in floating point representation. The floating point representation allows to support a higher dynamic range of the parameters and to facilitate sending the camera parameters with higher precision. The higher precision of the camera parameters has been shown to be important for the view synthesis.

SUMMARY

When synthesizing views based on extrapolation of input views, information may be missing for certain areas in the synthesized view, so-called disocclusions. Even though there are methods and algorithms for estimating the missing information, there is a limit to what these algorithms can achieve, and the estimation may lead to visual artefacts. Herein is suggested a solution to the problem of visual artefacts in synthesized views, which are due to disocclusion. The solution comprises providing information that may enable a view renderer or view synthesizer to determine whether it can perform a view synthesis at a certain camera position. The information sent to the view renderer may include the maximum difference between two consecutive depth or disparity values, for one or more video frames/access units or for an entire video sequence.

According to a first aspect, a method to be performed by an arrangement is provided. The arrangement is operable to receive an input video stream comprising an input view, which is associated with a first camera position. The method comprises receiving a measure M_D of a maximum difference in depth or disparity between two pixels in a depth or disparity map representing the depth or disparity information of a video frame of the input view. The method further comprises determining a maximum distance d_cam, from the first camera position to a second camera position, based on the received measure; and indicating the determined distance d_cam to a view synthesizer.

According to a second aspect, a method to be performed by another arrangement is provided, for supporting view synthesis. The method is performed in order to provide the information to the method described above. If the method according to the first aspect is seen as a method in a receiving device, the method according to the second aspect is the corresponding method in the transmitting device. The method comprises receiving a depth or disparity map representing the depth or disparity information of a video frame of an input view in an input video stream. The method further comprises determining a maximum difference M_D in depth or disparity between two pixels based on said depth or disparity map and providing the M_D to a second arrangement.

According to a third aspect, an arrangement is provided to carry out the method according to the first aspect. The arrangement comprises processing means and a memory for storing instructions, which when executed by the processing means causes the arrangement to receive a measure M_D of a maximum difference in depth or disparity value between two pixels in a depth or disparity map representing the depth or disparity information of a video frame of the input view. The arrangement is further caused to determine a maximal distance d_cam, from the first camera position to a second camera position, based on the received measure; and to indicate 103 the determined distance d_cam to a view synthesizer.

According to a fourth aspect, an arrangement is provided to carry out the method according to the second aspect. The arrangement comprises processing means and a memory for storing instructions, which when executed by the processing means causes the arrangement to receive a depth or disparity map representing the depth or disparity information of a video frame of the input view. The arrangement is further caused to determine a maximum difference M_D in depth or disparity between two pixels based on said depth or disparity map; and to provide the M_D to a second arrangement (such as an arrangement according to the third aspect).

The methods and arrangements described above may be implemented in a number of different embodiments, which will be described further in the detailed description.

The above aspects enable a view synthesizer to decide on the possible range of camera position when performing view extrapolation. The view renderer is therefore capable of estimating the maximum disocclusion (hole) width and/or of the amount of disocclusions whose width fall into a particular range in the incoming frames. The view renderer is therefore capable of choosing an appropriate view synthesis range that matches its hole concealment capabilities/view synthesis capabilities.

BRIEF DESCRIPTION OF THE DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
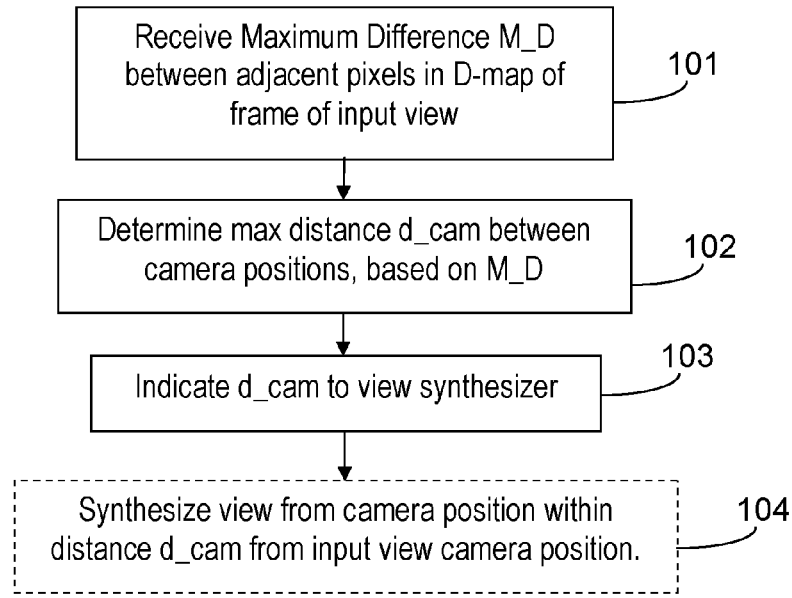
FIGS. 1-6 are flow charts illustrating methods according to different exemplifying embodiments.

In some configurations of 3D video coding, a view renderer or synthesizer can perform view extrapolation, i.e. it may synthesize a view from a virtual camera position which is outside the range of input camera positions. However, the quality of such synthesized extrapolated views can vary significantly, depending e.g. on the scene content and on the rendering capabilities. If the renderer chooses to synthesize a view that is outside an acceptable range, this may result in poor visual quality and in significant view synthesis artefacts. In order to overcome the problem, the renderer could decide to display a reduced viewing range, e.g. 3 stereoscopic baselines instead of 4 stereoscopic baselines. However, the renderer may not be able to choose a proper position for the synthesized viewing based on only the first received picture in a 3D video scene, since the scene content may later change, therefore making the chosen baseline distance, i.e. the extrapolated view position, unsuitable for the current renderer and the scene content. Hence, some prior information of the scene content is desirable.

View synthesis is often performed by projecting pixels from a coded and transmitted view to a view corresponding to a virtual camera position. There are two main approaches to do so: 1) a forward view synthesis and 2) a backward view synthesis. The forward view synthesis is performed by projecting the pixels from a coded view to virtual camera positions based of the depth or disparity that corresponds to the coded view. The backward view synthesis in its turn uses the depth or disparity map that corresponds to the virtual view and based of that finds a pixel position in the coded view that corresponds to the current position in the interpolated view. Then the backward view synthesis uses the found intensity value, or interpolated intensity value, as the value of the pixel. The expression "coded view" is herein used to refer to a captured view, i.e. a view which is not synthesized. Such a view will also be referred to as an "input view" herein.

A common problem of both the forward and backward view synthesis approaches is that some areas present in one view may be (dis-)occluded in another view. For example, if some area is present in the virtual view but is occluded, i.e. not visible, in the coded view, the information cannot be easily restored. This would correspond to "stretching" of the corresponding areas in the view backward view synthesis and to disocclusions, i.e. holes due to lack of information, in the forward view synthesis process. Such disocclusion corresponds to the area, to which no pixels were projected. In case of view interpolation, the disoccluded area may be filled from another view. However, in case of view extrapolation, there is no second view to fill the disocclusion. Therefore, some type of hole filling algorithm should be applied by a view renderer.

The disocclusion width depends both on the depth or disparity of the neighboring pixels and on the distance between the camera positions of the closest available coded view and the synthesized view. Thus, a view renderer would be able to determine the size of extrapolation "holes" after synthesis based on the depth values and a distance between a coded and a synthesized view, when such values are available. Thus, a view renderer would also be able to determine an appropriate extrapolation distance between a camera position of a coded view and a virtual camera position of a synthesized view based on the size of expected extrapolation "holes" and knowledge about its own disocclusion hole filling capabilities.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Exemplifying embodiments of a method performed by an arrangement will now be described with reference to FIG. 1. The arrangement is operable to receive an input video stream comprising an input view, which is associated with a first camera position. The video stream may comprise more than one view.

FIG. 1 illustrates the method comprising receiving 101 a measure M_D of a maximum difference in depth or disparity between two pixels in a depth or disparity map representing the depth or disparity information of a video frame of the input view. The method further comprises determining 102 a maximum distance d_cam, from the first camera position to a second camera position, based on the received measure; and indicating 103 the determined distance d_cam to a view synthesizer, e.g. a view synthesizing function within the arrangement.

The arrangement may alternatively be denoted decoder arrangement, a view synthesizer arrangement or a view rendering arrangement, depending on which components that are included in the arrangement. The arrangement could comprise different components, such as a decoder, a view synthesizer or view renderer. The arrangement may be connected to or be integrated with, e.g. as part of, a video decoder and/or a view synthesizer, which is illustrated e.g. in FIGS. 8a-8e, and will also be described further below.

The input stream comprises at least one input view. The input view is a view which is captured by a camera, and could also be denoted e.g. "existing view", "actual view", "coded view" or "real view". The first camera position is associated with the position of the camera when capturing the input view. For example, it could be an abstraction of the position, and it may be referred to as a position in an abstract coordination system, e.g. origo.

Depending on what is considered to be comprised in the arrangement, e.g. whether the arrangement comprises a video decoder or not, the received measure M_D, may be coded or decoded. If M_D is received in encoded form, e.g. comprised in an encoded video stream, it should first be decoded before the distance d_cam is determined. M_D may be expressed in different ways, which will be further described below. There are certain constraints as to the location, in relation to each other, of the two pixels in the map. It is not a question of any two pixels in the map, as in the case when quantizing the total depth in a frame. Here, since it is a question of disocclusions, i.e. lack of information in a virtual camera position, the pixels are to be located in a relative proximity of each other, such as e.g. on each side of a contour of an object. Exactly how many pixels that may separate the two pixels is difficult to say. Terms as "adjacent", "close", "neighboring", "near" or "nearby" could be used to describe their location relative each other. The pixels could be right next to each other, i.e. pixel n and n+1, or they could be separated by 1, 2, 3 or more, e.g. 16 or 32 pixels. This distance may be configured to a value or function based e.g. on test results. The distance between the pixels may depend on factors like image resolution and down sampling etc.

The determining of the distance d_cam may be performed in different ways, which will be further described below. However, the maximum distance d_cam depends on how large disocclusions that could be handled by the view synthesizer or view renderer. This in its turn may depend on which algorithm that is used in the view synthesizer to estimate or "fill in" disocclusions. The arrangement therefore preferably should have access to information regarding the maximum size of disocclusions or holes that can be handled, i.e. compensated for, by the view synthesizer. Such information could e.g. be retrieved or otherwise received from the view synthesizer. Alternatively, the arrangement has access to, e.g. is provided with, a default value, which covers the capacity, with regard to size of disocclusions, of a plurality or all possible view synthesizers.

The first camera position is associated with the input view, i.e. the input view was captured from the first camera position. The second camera position is associated with a synthesized view, and is a virtual camera position. The second camera position is the position in which the camera would have been located, in some coordinate system, if the synthesized view would have been captured by a camera.

The indicating of the determined distance d_cam to a view synthesizer may be performed by explicit signaling of the distance d_cam or a value derived from the distance d_cam, which value is indicative of d_cam. alternatively, d_cam could be implicitly signaled to the view synthesizer. The arrangement could be an integrated part of the view synthesizer, or comprise the view synthesizer. In FIG. 1, synthesizing a view from/at a second camera position within a distance d_cam from the input view camera position is illustrated as an action 104. Whether the action 104 is performed by the arrangement or not depends on whether the arrangement comprises a view synthesizer or not. Therefore, action 104 is illustrated with a dashed outline.

By the performing of the method described above, the view synthesizer is enabled to synthesize 104 a view associated with a second camera position, such that disocclusions, i.e. lack of information, due to the distance between the first and second camera position may be handled, which is an advantage. That is, a second camera position may be selected within the determined distance d_cam from the first camera position, which results in that the view synthesizer, e.g. a disocclusion compensation algorithm therein, can fill in the disocclusion holes in a synthesized view in an appropriate manner. That is, in a manner that does not generate visual artefacts, or only generates acceptable visual artefacts.

The received measure M_D may represent the maximum difference in depth or disparity between two pixels within a plurality of consecutive depth or disparity maps, each representing a video frame in the input view. That is, M_D may be the maximum value out of a number of maximum values, i.e. one value for each of the plurality of depth or disparity maps. Thus, M_D may be the maximum difference in depth or disparity between two pixels, located in the same map, in all of the plurality of depth or disparity maps. Note that the two pixels, the pixel pair, do not need to be located in the same area of the different maps. Thereby, the view synthesizer is enabled to select a second camera position which is appropriate, i.e. may be used, for the whole sequence of the view corresponding to the plurality of maps.

The received measure M_D may alternatively represent the maximum difference in depth or disparity between two pixels per map, averaged over the plurality of depth or disparity maps. That is, an average value may be calculated from a number of maximum differences, e.g. one per map/frame for a number of consecutive maps/frames. For example, by deriving such an average, the impact of exceptional values may be mitigated. The plurality of maps may be consecutive.

The two pixels, referred to above, are located in the proximity of each other along an axis in the plane of the depth or disparity map. The two pixels may be separated by x pixels, where x may be e.g. 0, 1, 2, 3; within the interval 0-16, or the interval 0-64, or 0-128, or similar, depending on preference, image resolution etc. That is, the pixels may be located next to each other, such as pixel "n" and "n+1" (x=0), or there may be a number of pixels between the two pixels, such as pixel "n" and pixel "n+1+x", e.g. "n+3", "n+4" or "n+5", etc. However, the pixels are located relatively close to each other, i.e. not in opposite ends of the map separated by a plurality of depth differences. In order for the distance in depth or disparity between the pixels should be useful for the purpose described herein, the pixels should be located on a respective surface, such that a disocclusion may appear between them when synthesizing a view from a virtual camera position. For example, the pixels may be horizontally adjacent or vertically adjacent.

Figure 2:
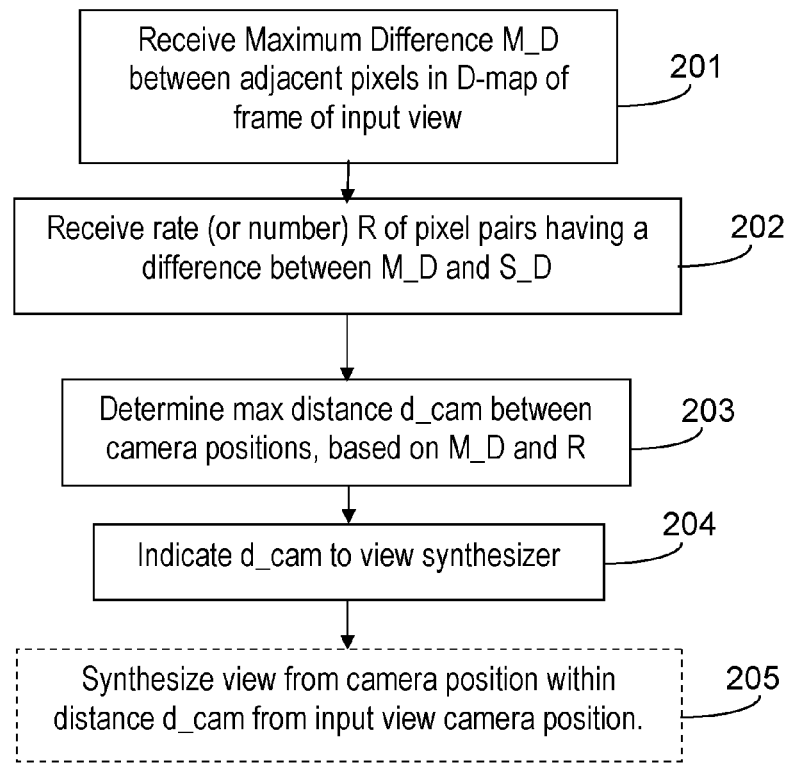

Further, a rate value may be received, representing a number of pairs of pixels, in a depth or disparity map, between which a difference in depth or disparity lies between the maximum difference M_D and a second difference S_D, which is lower than M_D. This is illustrated in FIG. 2, as action 202. The remaining actions in FIG. 2 correspond to the actions illustrated in FIG. 1, except that the distance d_cam is determined based on the rate value, in addition to M_D, in action 203. When such a rate value is received, the determining of a distance d_cam could also be based on said rate value, in addition to being based on M_D. Further, this requires that the lower difference value, S_D, which will also be denoted "blower" below, is either received by the arrangement or is known to the arrangement in some other way. For example, S_D could be configured to be 90% of M_D. For example, the receiving of this rate value, denoted "R" later in this description, may be used to determine, not only the largest size of a disocclusion at a certain second camera position, but also the amount of disocclusions of a certain size that will appear in an image or sequence of a view synthesized at the second camera position. For example, when the rate value is very low, it may be concluded/derived that the amount of disocclusions of a size corresponding to differences between M_D and S_D is very low, and vice versa. By this, it is possible to derive e.g. how much a disocclusion algorithm, or hole filling algorithm, will need to be applied for rendering a certain synthesized view for a certain second camera position. This may be useful e.g. to get an understanding of the distribution of hole sizes that needs to be filled. For instance, if M_D is 40 pixels, S_D is 10 pixels, and 99% of the holes are smaller than 10 pixels, i.e. R is 1% or 99% depending on how it is defined, and the average capability of the synthesizer is to be able to fill holes of size 20 pixels, then the view renderer may assume e.g. that the one percent of holes above 10 pixels would be acceptable and not generate very visible view synthesis artifacts.

Further, an indication may be received, of which of the two pixels that is associated with the highest depth or disparity value. For example, if using the terminology "left" and "right" (as when regarding an image), whether the left or the right pixel is associated with the largest depth, e.g. is associated with a surface that is located further away from the first camera position than a surface associated with the other pixel. This information is relevant for determining whether a disocclusion will appear or not for a certain second camera position. If again using the terminology "left" and "right", when the left pixel is associated with a larger depth than the right pixel, disocclusions associated with M_D will appear for a second camera position located to the left of the first camera position (as seen from a "behind the camera position"), but not for a second camera position to the right of the first camera position. The indication may be implemented e.g. as a bit which is set to either "1" or "0", where "1" may indicate "left pixel", and "0" may indicate "right pixel".

The distance d_cam may be determined either in a positive or negative direction from the first camera position along an axis, e.g. right or left along an horizontal axis, depending on which of the two pixels that is associated with the highest depth or disparity value.

Figure 3:
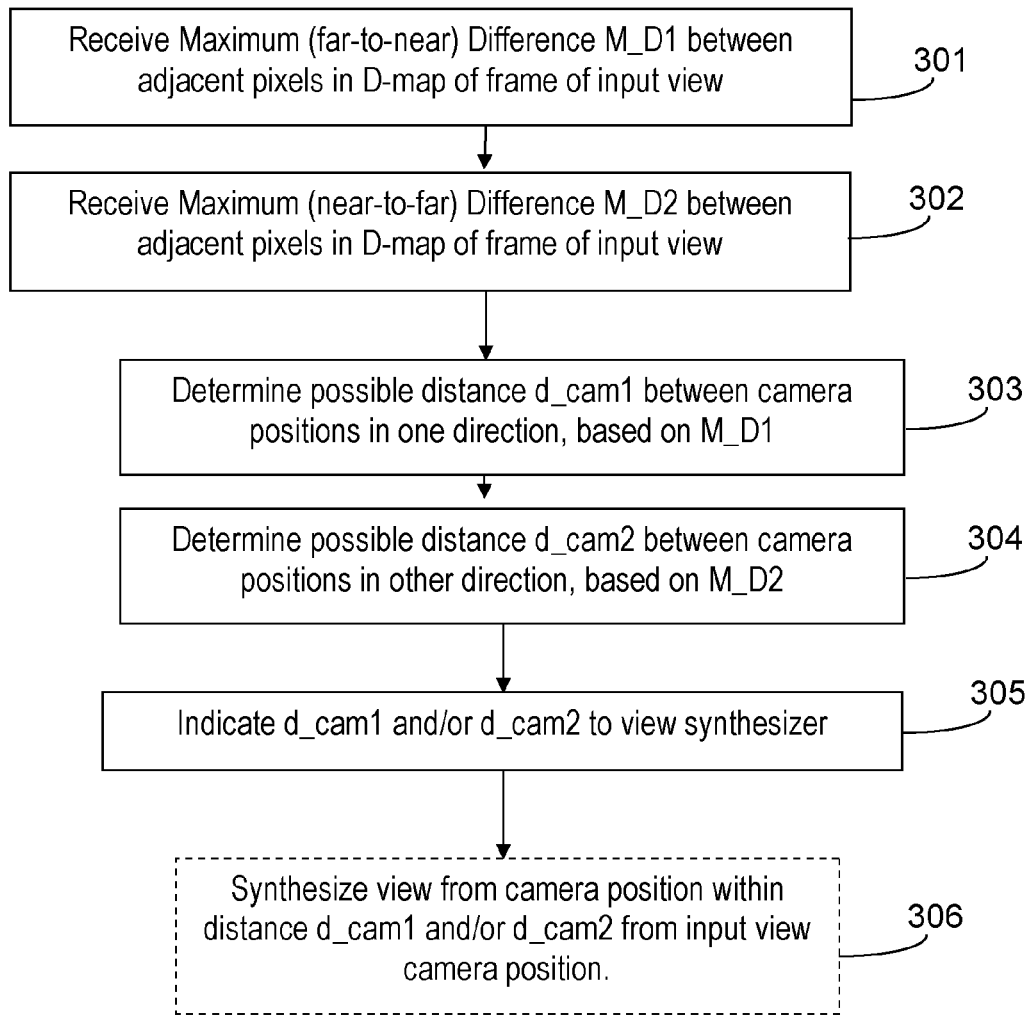

Two measures M_D may be received, denoted e.g. M_D1 and M_D2, where the first, M_D1, may represent the maximum difference in depth or disparity between two pixels; and where the second, M_D2, represents the maximum difference in depth or disparity between two other pixels, where M_D1 indicates a far-to-near difference in a direction in the plane of the depth or disparity map, and M_D2 indicates a near-to-far difference in the direction in the plane of the depth or disparity map. In FIG. 3, the receiving of M_D1 is illustrated as an action 301, and the receiving of M_D2 is illustrated as an action 302.

The use of the different values is related to on which side of the first camera position that the second camera position is to be located. In the terminology "left" and "right", the "near-to-far" difference could correspond to that the right pixel is associated with the largest depth; and the "far-to-near" difference would then correspond to that the left pixel was associated with the largest depth. In this case, M_D1 would be useful for determining a distance d_cam1 to the left of the first camera position (from a position "behind the cameras"), and M_D2 would be useful for determining a distance d_cam2 to the right of the first camera position. The determining of d_cam1 and d_cam2 is illustrated as actions 303 and 304 in FIG. 3. M_D1 and M_D2 may be denoted Dmax_l and Dmax_r, when using a terminology of "left" (l)

and "right" (r), which will be the case further below in this description. The rate value mentioned above may also be received in two versions, one associated with M_D1 and one associated with M_D2. These rate values may, in analogy with the above, be denoted R_l and R_r.

The determining of the distance d_cam may further be based on a texture structure complexity value T_C indicative of a complexity of a texture in the video frame of the input view at a location corresponding to a location of at least one of the two pixels in the depth or disparity map (not shown). The texture complexity value T_C may be received from another arrangement, which derives T_C from the input view, e.g. together with M_D, before the input view is encoded and transmitted to a receiver of the encoded video stream. This value may be useful due to that it is more difficult for a disocclusion algorithm to determine how, i.e. "with what" a disocclusion should be filled when the texture of the filling is difficult to estimate, for example when the missing texture has irregular and/or asymmetrical or otherwise unpredictable patterns or structures.

As previously described the arrangement may comprise different components, such as a video decoder for decoding an (encoded) input video stream; a view synthesizer for synthesizing the view discussed above; and/or a view renderer for rendering a number of views for display.

Embodiments herein also relate to a method performed by another arrangement, for supporting view synthesis. The method is performed in order to provide the information to the method described above. If the above method is seen as a method in a receiving device, the method described below is the corresponding method in the transmitting device.

Figure 4:
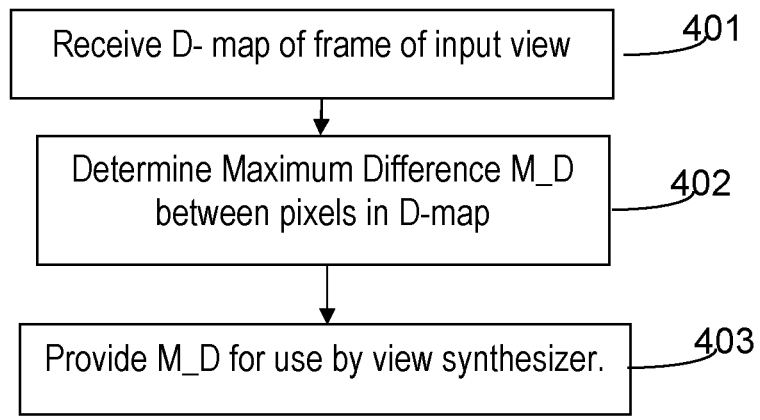

Such a method performed by an arrangement will now be described with reference to FIG. 4. FIG. 4 illustrates the method comprising receiving 401 a depth or disparity map representing the depth or disparity information of a video frame of an input view in an input video stream. The method further comprises determining a maximum difference M_D in depth or disparity between two pixels based on said depth or disparity map and providing the M_D to a second arrangement. Thereby, the second arrangement is enabled to determine a maximal distance d_cam, from a first camera position associated with the input view to a second camera position associated with a synthesized view, based on the received M_D.

The depth or disparity map, which will be referred to as only "map" below, may be a regular map, as the ones normally used in video coding. That is, the method described herein does not require any special type of map, but can be used on a map of a known type. An example of such maps is shown e.g. in FIG. 9.

Each pixel or pixel value in such a map is associated with a depth in a corresponding image, i.e. a distance from a point such as the location of the camera capturing the image. A difference between map pixels or map pixel values may be translated to a difference in depth.

Regarding the two pixels, their character e.g. their location in relation to each other, is previously described above.

The determining of the maximum difference M_D may be performed in different ways. According to a "brute force" method, each pixel is compared to all other pixels within a predetermined distance, where the distance may be defined e.g. as a number of pixels. Alternatively, each pixel may be compared only to pixels at a certain distance and/or in a certain direction from the pixel. Alternatively, only pixels within a certain first sub-area of the depth or disparity map may be compared only to pixels within a certain second sub-area (which may be overlapping with the first sub-area) of the depth or disparity map. The difference, i.e. the result of each comparison, may be a numerical, or other, value, where the largest value may be selected as M_D. M_D could alternatively be the second largest value, or some other value selected according to some rule, e.g. a mean value of the ten largest values.

The providing of the M_D to a second arrangement may be performed in different ways. The M_D could be encoded and transmitted over an air interface to the second arrangement, in case the arrangement comprises a video encoder (codec) and a transceiver. In case the arrangement determining M_D does not comprise a video encoder, the providing may comprise providing M_D to a video encoder, which may encode M_D together with the input view and related depth or disparity maps. The M_D is considered to be provided to the other arrangement also when it is subjected to intermediate storage, e.g. in an intermediate node.

As previously described, M_D could be the largest difference between two pixels, located according to the above, in a plurality of maps associated with video frames in the input view. That is, M_D could be the maximum out of a number of maxima (one for each map). Alternatively, M_D could be a mean value of a/the number of maxima.

Further, in accordance with the above, the two pixels may be located in the proximity of each other along an axis in the plane of the map. For example, the pixels may be horizontally or vertically adjacent.

Figure 5:
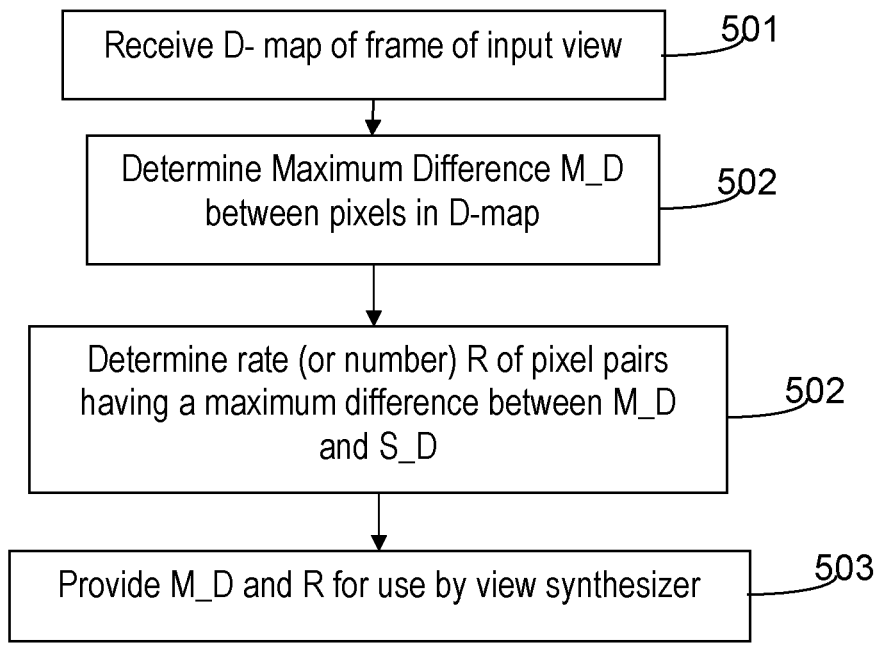

The method could further comprise determining a rate value, R, based on the depth or disparity map, where R represents a number, e.g. a maximum, of pairs of pixels, between which a difference in depth or disparity lies between the maximum difference M_D and a second difference S_D, which is lower than M_D. The method may further comprise providing the determined rate value, R, to the second arrangement, i.e. an arrangement associated with a decoder side and/or view synthesis. In FIG. 5, the determining of the rate value R is illustrated as action 503, and the providing of R to the second arrangement is illustrated as action 504. Actions 501 and 502 in FIG. 5 correspond to actions 401 and 402 in FIG. 4.

For example, if M_D=10, and S_D is configured to be 90% of M_D, then S_D=9. The rate value R would then reflect the number of pixel pairs between which the difference is from 9 to 10 [units]. R could be given e.g. as a percentage of all pixels in the map or as an absolute number.

The providing of R to a second arrangement may be performed as the providing of M_D. R could, for example, be encoded together with M_D and the rest of the input view/input video stream and be transmitted over an air interface. As for M_D, R could be subjected to intermediate storage together with the related view/video stream.

The method may further comprise determining which of the two pixels that is associated with the highest depth or disparity value, based on the depth or disparity map, and providing an indication of which of the two pixels that is associated with the highest depth or disparity value to the second arrangement. This may be performed in association with the determining of M_D, e.g. the sign of M_D may be indicative of which of the two pixels that is associated with the largest depth/highest depth value. This works if the difference between the two pixels is calculated in a similar manner for all pixel pairs, e.g. if the difference is calculated by subtracting the depth value of a pixel "to the right" from the depth value of a pixel "to the left".

Two measures M_D may be determined: M_D1 and M_D2, and be provided to the second arrangement. The first, M_D1, may represent the maximum difference in depth or disparity between two pixels in a map; and the second, M_D2, may represent the maximum difference in depth or disparity between two other pixels in the same or another map. M_D1 may indicate a far-to-near difference in a direction in the plane of the depth or disparity map, and M_D2 may indicate a near-to-far difference in the direction in the plane of the depth or disparity map. This has been described above, and will be further described later below.

The method may further comprise determining a texture structure complexity value T_C indicative of a complexity of a texture structure in a video frame of the input view at a location corresponding to a location of at least one of the two pixels in the depth or disparity map. T_C may be determined e.g. by the amount/distribution of spatial frequencies of the texture/subset of texture, deblocking filter coefficients selected by the coder/decoder or the quantization parameter used by the coder/decoder.

The arrangement may comprise a video encoder or codec for encoding the determined values to the second arrangement.

In an exemplifying embodiment, the maximum change, i.e. difference, in depth values over a range of frames is sent to a view synthesizer or renderer. The changes in the depth values can be translated to the possible disocclusion, or extrapolation "hole", width e.g. by use of the formulas derived in the following:

In the 3DV-MVC (3-Dimensional Vision Multiview Video Coding) coding format, the quantized values of the depth maps can be translated to the "real" depth value Z by using the following formula:

$$Z = \frac{1.0}{\frac{v}{255.0} \cdot \left(\frac{1.0}{Z_{near}} - \frac{1.0}{Z_{far}}\right) + \frac{1.0}{Z_{far}}} \quad (1)$$

where v is the value of the depth map sample.

There are two ways of calculating the projected pixels position. One way is using a matrix multiplication. However, when a 1D linear camera arrangement is used, there is a simple way to perform a view synthesis. In case of a 1D linear camera arrangement, the view synthesis equations can be reduced to:

$$d = \frac{f \cdot l}{z} + du \quad (2)$$

where d is the resulted displacement (disparity) value, f is the focal length of the camera, l is the baseline distance and du is the sensor (image) shift. All pixels from the coded view can be mapped to the corresponding pixels in the synthesized view by applying the displacement/disparity d to the horizontal coordinate (x) of the sample position in the image.

From this formula (2), a disocclusion width can be estimated. As an example, two samples that are located next to each other may be considered. Consider, for example, that p1 and p2 are two neighboring pixels, where pixel p1 is located on the left and the pixel p2 is next to the right, their coordinates being (x1,y) and (x2=x1+1,y) respectively and that the synthesized camera position is on the left from the coded camera position. These two samples will be mapped to the virtual camera position by applying shifts d1=f*l /z1+du and d2=f*l /z2+du. Therefore, the difference in the displacement of pixels p1 and p2 will be $$d2 - d1 = f * l(1/z2 - 1/z1) \quad (3)$$
$$= \frac{fl}{255}\left(\frac{1.0}{Z_{near}} - \frac{1.0}{Z_{far}}\right)(v2 - v1)$$
$$= K * (v2 - v1)$$

where 255 is the value corresponding to the maximum depth value in the 8-bit format and can be replaced with the corresponding value for another bit-depth format, which is equal to $(2^{bitdepth})-1$. A positive difference in displacement values d2−d1 means that there is a disocclusion with the width of d2−d1, whereas a negative value of d2−d1 indicates an occlusion.

Similar reasoning is applicable to the view synthesis algorithm used in Test Model under Consideration TMuC [MPEG document number N12744], where the following formula for the pixels displacement d in view synthesis is used instead:

$$d=(s*v+o)>>n \quad (4)$$

where v is the depth sample value, s is the transmitted scale factor, o is the transmitted offset, and n is a shift parameter that depends on the required accuracy of the disparity vectors. Here, the scale factor s and the offset o depend on difference between the coded and the virtual camera positions.

When using formula (4), the difference in the displacements will be equal to:

$$d2-d1=s(v2-v1)>>n \quad (5)$$

In this case, the width of a disocclusion (hole) is equal to (d2−d1).

A symmetric reasoning can be applied to the view synthesis extrapolation in the direction to the right from the coded camera view. In this case, similarly, positive values of (d1−d2) would correspond to an occlusion, whereas negative values of (d1−d2) would correspond to a disocclusion, i.e. a hole. In this example, we suppose that the baseline distance is represented by a negative value in case view synthesis is performed to the left from the coded camera. The corresponding formulas for the view synthesis to the right direction the following formulas should be used:

$$d1 - d2 = f * l(1/z2 - 1/z1) \quad (6)$$
$$= \frac{fl}{255}\left(\frac{1.0}{Z_{near}} - \frac{1.0}{Z_{far}}\right)(v2 - v1)$$
$$= K * (v2 - v1)$$
$$d1 - d2 = s(v1 - v2) >> n \quad (7)$$

In this case, the hole (disocclusion) width would be equal to (d2−d1) as well.

Based on the formulas (3) or (5) for the view rendering to the right and formulas (6) (7) for view synthesis to the left, the hole (disocclusion) width W is equal to (d2−d1).

Having the corresponding camera parameters for formulas (3) and (6) or a scaling factor for formulas (5) and (7) and knowing the baseline, the view renderer can estimate the respective hole width provided it knows the difference in depth values (v1−v2) for the two neighboring pixels for view extrapolation to the right and the view (v2−v1) for the view extrapolation to the left.

Based on the above, it is proposed herein, for example, to signal to a receiver, associated with a view synthesizer, the corresponding maximum distance between the neighboring depth values (v1−v2) for view synthesis to the right, called Dmax_r and the maximum pixels difference (v2−v1) for the view synthesis to the left, which is denoted in the following as Dmax_l.

The proposed maximum values can be signaled for a subset of frames, for example, for frames that correspond to one coded sequence or "scene", or, for the frames between two random access points.

Having received Dmax_r and/or Dmax_l, the view renderer can estimate a maximum disocclusion (hole) width at a particular camera position and make a decision whether it is possible to render subsequent frames at a particular camera position provided the encoder knows its hole filling or so-called inpainting, capabilities.

Instead of signaling a maximum depth difference, a maximum disparity difference could be signaled e.g. for a number of subsequent frames, e.g. when disparity maps are used instead of depth maps.

In addition to signaling of a maximum depth difference, an encoder can also signal a lower depth difference value for the neighboring pixels. In this case, the encoder can also signal the ratio of the pixels, whose depth distances fall in the specified range. As previously mentioned, the lower depth difference value does not necessarily need to be signaled, but can e.g. be determined according to a pre-defined scheme by a receiver, based on a received maximum depth difference. For example, the lower depth difference could be a certain percentage of the maximum depth difference.

For example, in addition to signaling Dmax_r, the value Dlower_r<=Dmax_r, could be signaled, and the ratio R_r of the pixels, whose differences between the depth values $(v_{x,y}-v_{x+1,y})$ fall in the specified range (Dlower_r, Dmax_r), where x and y are coordinates of a depth sample. Also, the value of $(v_{x-1,y}-v_{x,y})$ can be used instead.

Similarly, values Dlower_l and R_l can be signaled together with Dmax_l, which correspond to the synthesis to the left direction. In this case, a ratio R_l of pixels, whose differences between the depth values $(v_{x+1,y}-v_{x,y})$ fall in the specified range (Dlower_l, Dmax_l), where x and y are coordinates of a depth sample. Also, the value of $(v_{x,y}-v_{x-1,y})$ can be used instead.

This enables a view renderer to estimate a percentage, a ratio, of pixels that would result in the disocclusions, whose width fall into the range (Wlower_l, Wmax_l) that correspond to the range of Dlower_l, Dmax_l respectively. The same hold for the view synthesis to the right direction.

It is also possible not to signal the lower values of D (Dlower_r and Dlower_l) explicitly but to assume instead that they are equal to a particular value bound to the Dmax_r and Dmax_l, for example half of quarter of Dmax_l or Dmax_r, or more general (a*Dmax_r+b) or (c*Dmax_l+d), where a, b, c and d are predefined constants. More generally, a histogram of expected hole sizes could be sent, i.e. a histogram that indicates the frequency of hole occurrence over the hole size.

It is also possible to use downsampled or upsampled depth maps in derivation of the values discussed above. Subsampling could be useful for depth maps which do not have distinct object borders as a result of poor acquisition or encoding of the depth map. For instance, the depth map may be subsampled by a factor 16. Thus the differences between every $16^{th}$ pixels are calculated which still gives a good indication of the difference in neighboring depth values at the same time as the misleading impact of blurry object borders can be avoided. Another solution is to just use a subset of the possible depth map.

It would also be possible to use e.g. average values of groups of depth values. Averaging the maximum depth difference value over frames could result in a more stable value that is not influenced by very short fluctuations in depth differences, and may thus be more representative for the perceptible maximum depth difference e.g. of a scene. The maximum depth differences averaged over a number of frames, here called avgDmax_r and avgDMax_l, respectively, for the right and left side may be calculated using the following formulas:

$$avgD\max\_r = \frac{\sum_{n=1}^{nbrFrames} D\max\_r_n}{nbrFrames} \quad (8)$$

and $$avgD\max\_l = \frac{\sum_{n=1}^{nbrFrames} D\max\_l_n}{nbrFrames} \quad (9)$$

where $Dmax\_r_n$ and $Dmax\_l_n$ are the maximum depth difference for frame n.

The exemplifying embodiments described below are examples of application of the solution described herein. These examples are, however, not restrictive and can be used separately or in combination with each other or other methods.

Embodiment 1

In an exemplifying embodiment, Dmax_l and Dmax_r is signaled via the 3D view scalability information SEI message described in [1].

A proposed exemplifying new SEI syntax is provided below where Dmax_l and Dmax_r are called max_depth_discontinuity_left and max_depth_discontinuity_right respectively. The changes to the current syntax are highlighted by grey color.

TABLE 1

| 3D view scalability information SEI message syntax | C | Descriptor |
|---|---|---|
| 3d_view_scalability_info( payloadSize ) { | | |
|   num_operation_points_minus1 | 5 | ue(v) |
|   for( i = 0; i <= num_operation_points_minus1; i++ ) { | | |
|     operation_point_id[ i ] | 5 | ue(v) |
|     priority_id[ i ] | 5 | u(5) |
|     temporal_id[ i ] | 5 | u(3) |
|     num_target_output_views_minus1[ i ] | 5 | ue(v) |
|     op_with_depth_flag[ i ] | 5 | u(1) |
|     for( j = 0; j <= num_target_output_views_minus1[ i ]; j++ ) | | |
|       view_id[ i ][ j ] | 5 | ue(v) |

TABLE 1-continued 3D view scalability information SEI message syntax

| 3d_view_scalability_info( payloadSize ) { | C | Descriptor |
|---|---|---|
|     profile_level_info_present_flag[ i ] | 5 | u(1) |
|     bitrate_info_present_flag[ i ] | 5 | u(1) |
|     frm_rate_info_present_flag[ i ] | 5 | u(1) |
|     if( !num_target_output_views_minus1[ i ]) | | |
|       view_dependency_info_present_flag[ i ] | 5 | u(1) |
|     parameter_sets_info_present_flag[ i ] | 5 | u(1) |
|     bitstream_restriction_info_present_flag[ i ] | 5 | u(1) |
|     if ( profile_level_info_present_flag[ i ] ) | | |
|       op_profile_level_idc[ i ] | 5 | u(24) |
|     if( bitrate_info_present_flag[ i ] ) { | | |
|       avg_bitrate[ i ] | 5 | u(16) |
|       max_bitrate[ i ] | 5 | u(16) |
|       max_bitrate_calc_window[ i ] | 5 | u(16) |
|     } | | |
|     if( frm_rate_info_present_flag[ i ] ) { | | |
|       constant_frm_rate_idc[ i ] | 5 | u(2) |
|       avg_frm_rate[ i ] | 5 | u(16) |
|     } | | |
|     if( view_dependency_info_present_flag[ i ] ) { | | |
|       num_directly_dependent_views[ i ] | 5 | ue(v) |
|       for( j = 0; j < num_directly_dependent_views[ i ]; j++ ) { | | |
|         directly_dependent_view_id[ i ][ j ] | 5 | ue(v) |
|       if( op_with_depth_flag[ i ] ) { | | |
|         num_directly_dependent_depth_views[ i ] | 5 | ue(v) |
|         for( j = 0; j < num_directly_dependent_views[ i ]; j++ ) { | | |
|           directly_dependent_depth_view_id[ i ][ j ] | 5 | ue(v) |
|         } | | |
|     } else | | |
|       view_dependency_info_src_op_id[ i ] | 5 | ue(v) |
|     if( parameter_sets_info_present_flag[ i ] ) { | | |
|       num_seq_parameter_set_minus1[ i ] | 5 | ue(v) |
|       for( j = 0; j <= num_seq_parameter_set_minus1[ i ]; j++ ) | | |
|         seq_parameter_set_id_delta[ i ][ j ] | 5 | ue(v) |
|       num_subset_seq_parameter_set_minus1[ i ] | 5 | ue(v) |
|       for( j = 0; j <= num_subset_seq_parameter_set_minus1[ i ]; j++ ) | | |
|         subset_seq_parameter_set_id_delta[ i ][ j ] | 5 | ue(v) |
|     num_pic_parameter_set_minus1[ i ] | 5 | ue(v) |
|     for( j = 0; j <= num_init_pic_parameter_set_minus1[ i ]; j++ ) | | |
|       pic_parameter_set_id_delta[ i ][ j ] | 5 | ue(v) |
|     } else | | |
|       parameter_sets_info_src_op_id[ i ] | 5 | ue(v) |
|     if( bitstream_restriction_info_present_flag[ i ] ) { | | |
|       motion_vectors_over_pic_boundaries_flag[ i ] | 5 | u(1) |
|       max_bytes_per_pic_denom[ i ] | 5 | ue(v) |
|       max_bits_per_mb_denom[ i ] | 5 | ue(v) |
|       log2_max_mv_length_horizontal[ i ] | 5 | ue(v) |
|       log2_max_mv_length_vertical[ i ] | 5 | ue(v) |
|       num_reorder_frames[ i ] | 5 | ue(v) |
|       max_dec_frame_buffering[ i ] | 5 | ue(v) |
|     } | | |
|     if ( op_with_depth_flag[ i ] ) { | | |
|     max_depth_discontinuity_flag [ i ] | 5 | u(1) |
|     if ( max_depth_discontinuity_flag [ i ] ) { | | |
|       max_depth_discontinuity_left[ i ] | 5 | ue(v) |
|       max_depth_discontinuity_right[ i ] | 5 | ue(v) |
|     } | | |
|   } | | |
| } | | |

Embodiment 2

In an exemplifying embodiment, Dmax_l and Dmax_r is signaled via the 3D view scalability information SEI message as in embodiment 1 above.

A new SEI message syntax is provided below. In this SEI message, lower_depth_discontinuity values and the ratio_depth discontinuity values are also sent, in addition to Dmax_l and Dmax_r. This enables the encoder to estimate a number of holes (depth discontinuities in the subsequent frames). The changes to the current syntax are highlighted by grey color.

TABLE 3

| 3D view scalability information SEI message syntax | | |
|---|---|---|
| 3d_view_scalability_info( payloadSize ) { | C | Descriptor |
|   num_operation_points_minus1 | 5 | ue(v) |
|   for( i = 0; i <= num_operation_points_minus1; i++ ) { | | |
|     operation_point_id[ i ] | 5 | ue(v) |
|     priority_id[ i ] | 5 | u(5) |
|     temporal_id[ i ] | 5 | u(3) |
|     num_target_output_views_minus1[ i ] | 5 | ue(v) |
|     op_with_depth_flag[ i ] | 5 | u(1) |
|     for( j = 0; j <= num_target_output_views_minus1[ i ]; j++ ) | | |
|       view_id[ i ][ j ] | 5 | ue(v) |
|     profile_level_info_present_flag[ i ] | 5 | u(1) |
|     bitrate_info_present_flag[ i ] | 5 | u(1) |
|     frm_rate_info_present_flag[ i ] | 5 | u(1) |
|     if( !num_target_output_views_minus1[ i ] ) | | |
|       view_dependency_info_present_flag[ i ] | 5 | u(1) |
|     parameter_sets_info_present_flag[ i ] | 5 | u(1) |
|     bitstream_restriction_info_present_flag[ i ] | 5 | u(1) |
|     if ( profile_level_info_present_flag[ i ] ) | | |
|       op_profile_level_idc[ i ] | 5 | u(24) |
|     if( bitrate_info_present_flag[ i ] ) { | | |
|       avg_bitrate[ i ] | 5 | u(16) |
|       max_bitrate[ i ] | 5 | u(16) |
|       max_bitrate_calc_window[ i ] | 5 | u(16) |
|     } | | |
|     if( frm_rate_info_present_flag[ i ] ) { | | |
|       constant_frm_rate_idc[ i ] | 5 | u(2) |
|       avg_frm_rate[ i ] | 5 | u(16) |
|     } | | |
|     if( view_dependency_info_present_flag[ i ] ) { | | |
|       num_directly_dependent_views[ i ] | 5 | ue(v) |
|       for( j = 0; j < num_directly_dependent_views[ i ]; j++ ) { | | |
|         directly_dependent_view_id[ i ][ j ] | 5 | ue(v) |
|       if( op_with_depth_flag[ i ] ) { | | |
|         num_directly_dependent_depth_views[ i ] | 5 | ue(v) |
|         for( j = 0; j < num_directly_dependent_views[ i ]; j++ ) { | | |
|           directly_dependent_depth_view_id[ i ][ j ] | 5 | ue(v) |
|         } | | |
|     } else | | |
|       view_dependency_info_src_op_id[ i ] | 5 | ue(v) |
|     if( parameter_sets_info_present_flag[ i ] ) { | | |
|       num_seq_parameter_set minus1[ i ] | 5 | ue(v) |
|       for( j = 0; j <= num_seq_parameter_set_minus1[ i ]; j++ ) | | |
|         seq_parameter_set_id_delta[ i ][ j ] | 5 | ue(v) |
|       num_subset_seq_parameter_set minus1[ i ] | 5 | ue(v) |
|       for( j = 0; j <= num_subset_seq_parameter_set_minus1[ i ]; j++ ) | | |
|         subset_seq_parameter_set_id_delta[ i ][ j ] | 5 | ue(v) |
|       num_pic_parameter_set_minus1[ i ] | 5 | ue(v) |
|       for( j = 0; j <= num_init_pic_parameter_set_minus1[ i ]; j++ ) | | |
|         pic_parameter_set_id_delta[ i ][ j ] | 5 | ue(v) |
|     } else | | |
|       parameter_sets_info_src_op_id[ i ] | 5 | ue(v) |
|     if( bitstream_restriction_info_present_flag[ i ] ) { | | |
|       motion_vectors_over_pic_boundaries_flag[ i ] | 5 | u(1) |
|       max_bytes_per_pic_denom[ i ] | 5 | ue(v) |
|       max_bits_per_mb_denom[ i ] | 5 | ue(v) |
|       log2_max_mv_length_horizontal[ i ] | 5 | ue(v) |
|       log2_max_mv_length_vertical[ i ] | 5 | ue(v) |
|       num_reorder_frames[ i ] | 5 | ue(v) |
|       max_dec_frame_buffering[ i ] | 5 | ue(v) |
|     } | | |
|     if ( op_with_depth_flag[ i ] ) { | | |
|     max_depth_discontinuity_flag [ i ] | 5 | u(1) |
|     if ( max_depth_discontinuity_flag [ i ] ) | | |
|       ratio_depth_discontinyity_flag[ i ] | 5 | u(1) |
|     if ( max depth discontinuity flag [ i ] ) { | | |
|       max_depth_discontinuity_left[ i ] | 5 | u(8) |
|       max_depth_discontinuity_right[ i ] | 5 | u(8) |
|     } | | |
|     if ( ratio_depth_discontinuity_flag [ i ] ) { | | |
|       lower_depth_discontinuity_left[ i ] | 5 | u(8) |
|       lower_depth_discontinuity_right[ i ] | 5 | u(8) |
|       ratio_discontinuty_left[ i ] | 5 | ue(v) |
|       ratio_discontinuty_right[ i ] | 5 | ue(v) |
|     } | | |
|   } | | |
| } | | |

Embodiment 3

In an exemplifying embodiment, Dmax_l and Dmax_r are signaled via the depth acquisition SEI message in [1].

An exemplifying new SEI syntax is provided below, where Dmax_l and Dmax_r are called max_depth_discontinuity_left and max_depth_discontinuity_right, respectively. The changes to the current syntax are highlighted by grey color.

In this SEI message, lower_depth_discontinuity values and the ratio_depth discontinuity values are also sent. This enables the encoder to estimate a number of holes (depth discontinuities in the subsequent frames).

Embodiment 4

In an exemplifying embodiment, Dmax_l and Dmax_r is signaled via the depth acquisition SEI message in [1].

An exemplifying new SEI syntax is provided below, where Dmax_l and Dmax_r are called max_depth_discontinuity_left and max_depth_discontinuity_right respectively as in embodiment 3 above. However, here the lower_depth_discontinuity values and the ratio_depth discontinuity values are not included in the message. The changes to the current syntax are highlighted by grey color.

TABLE 3

Depth acquisition information SEI message syntax

| depth_acquisition_info( payloadSize ) { | C | Descriptor |
|---|---|---|
|   all_views_equal_flag | 5 | u(1) |
|   if( all_views_equal_flag == 0 ) | | |
|     num_views_minus1 | 5 | ue(v) |
|     numViews = num_views_minus1 + 1 | | |
|   else | | |
|   num_frames | 5 | ue(v) |
|     numViews = 1 | | |
|   z_near_flag | 5 | u(1) |
|   z_far_flag | 5 | u(1) |
|   d_min_flag | 5 | u(1) |
|   d_max_flag | 5 | u(1) |
|   focal_length_x_flag | 5 | u(1) |
|   focal_length_y_flag | 5 | u(1) |
|   principal_point_x_flag | 5 | u(1) |
|   principal_point_y_flag | 5 | u(1) |
|   translation_flag | 5 | u(1) |
|   max_depth_discontinuity_flag | 5 | u(1) |
|   if ( max_depth_discontinuity_flag ) | | |
|     ratio_depth_discontinuity_flag | 5 | u(1) |
|   for( i = 0; i < numViews; i++ ) { | | |
|     if( z_near_flag ) | | |
|       depth_acquisition_element( i, num_frames, 0, 7, ZNearSign, ZNearExp, ZNearMantissa, ZNearManLen ) | | |
|     if( z_far_flag ) | | |
|       depth_acquisition_sei_element( i, num_frames, 0, 7, ZFarSign, ZFarExp, ZFarMantissa, ZFarManLen ) | | |
|     if( d_min_flag ) | | |
|       depth_acquisition_sei_element( i, num_frames, 0, 7, DMinSign, DMinExp, DMinMantissa, DMinManLen ) | | |
|     if( d_max_flag ) | | |
|       depth_acquisition_sei_element( i, num_frames, 0, 7, DMaxSign, DMaxExp, DMaxMantissa, DMaxManLen ) | | |
|     if( focal_length_x_flag ) | | |
|       depth_acquisition_sei_element( i, num_frames, 1, 6, FocalLengthXSign, FocalLengthXExp, FocalLengthXMantissa, FocalLengthXManLen ) | | |
|     if( focal_length_y_flag ) | | |
|       depth_acquisition_element( i, num_frames, 1, 6, FocalLengthYSign, FocalLengthYExp, FocalLengthYMantissa, FocalLengthYManLen ) | | |
|     if( principal_point_x_flag ) | | |
|       depth_acquisition_element( i, num_frames, 1, 6, PrincipalPointXSign, PrincipalPointXExp, PrincipalPointXMantissa, PrincipalPointXManLen ) | | |
|     if( principal_point_y_flag ) | | |
|       depth_acquisition_element( i, num_frames, 1, 6, PrincipalPointYSign, PrincipalPointYExp, PrincipalPointYMantissa, PrincipalPointYManLen ) | | |
|     if( translation_flag ) | | |
|       depth_acquisition_element( i, num_frames, 1, 6, TXSign, TXExp, TXMantissa, TXManLen ) | | |
|     if ( max_depth_discontinuity_flag) { | | |
|       max_depth_discontinuity_left[ i ] | 5 | u(8) |
|       max_depth_discontinuity_right[ i ] | 5 | u(8) |
|     } | | |
|     if ( ratio_depth_discontinuity_flag ) { | | |
|       lower_depth_discontinuity_left[ i ] | 5 | u(8) |
|       lower_depth_discontinuity_right[ i ] | 5 | u(8) |
|       ratio_discontinuty_left[i] | 5 | ue(v) |
|       ratio_discontinuty_right[i] | 5 | ue(v) |
|     } | | |
|   } | | |
| } | | |

TABLE 4

Depth acquisition information SEI message syntax

| depth_acquisition_info( payloadSize ) { | C | Descriptor |
|---|---|---|
|   all_views_equal_flag | 5 | u(1) |
|   if( all_views_equal_flag = = 0 ) | | |
|     num_views_minus1 | 5 | ue(v) |
|     numViews = num_views_minus1 + 1 | | |
|   else | | |
|   num_frames | 5 | ue(v) |
|     numViews = 1 | | |
|   z_near_flag | 5 | u(1) |
|   z_far_flag | 5 | u(1) |
|   d_min_flag | 5 | u(1) |
|   d_max_flag | 5 | u(1) |
|   focal_length_x_flag | 5 | u(1) |
|   focal_length_y_flag | 5 | u(1) |
|   principal_point_x_flag | 5 | u(1) |
|   principal_point_y_flag | 5 | u(1) |
|   translation_flag | 5 | u(1) |
|   max_depth_discontinuity_flag | 5 | u(1) |
|   for( i = 0; i < numViews; i++ ) { | | |
|     if( z_near_flag ) | | |
|       depth_acquisition_element( i, num_frames, 0, 7, ZNearSign, ZNearExp, ZNearMantissa, ZNearManLen ) | | |
|     if( z_far_flag ) | | |
|       depth_acquisition_sei_element( i, num_frames, 0, 7, ZFarSign, ZFarExp, ZFarMantissa, ZFarManLen ) | | |
|     if( d_min_flag ) | | |
|       depth_acquisition_sei_element( i, num_frames, 0, 7, DMinSign, DMinExp, DMinMantissa, DMinManLen ) | | |
|     if( d_max_flag ) | | |
|       depth_acquisition_sei_element( i, num_frames, 0, 7, DMaxSign, DMaxExp, DMaxMantissa, DMaxManLen ) | | |
|     if( focal_length_x_flag ) | | |
|       depth_acquisition_sei_element( i, num_frames, 1, 6, FocalLengthXSign, FocalLengthXExp, FocalLengthXMantissa, FocalLengthXManLen ) | | |
|     if( focal_length_y_flag ) | | |
|       depth_acquisition_element( i, num_frames, 1, 6, FocalLengthYSign, FocalLengthYExp, FocalLengthYMantissa, FocalLengthYManLen ) | | |
|     if( principal_point_x_flag ) | | |
|       depth_acquisition_element( i, num_frames, 1, 6, PrincipalPointXSign, PrincipalPointXExp, PrincipalPointXMantissa, PrincipalPointXManLen ) | | |
|     if( principal_point_y_flag ) | | |
|       depth_acquisition_element( i, num_frames, 1, 6, PrincipalPointYSign, PrincipalPointYExp, PrincipalPointYMantissa, PrincipalPointYManLen ) | | |
|     if( translation_flag ) | | |
|       depth_acquisition_element( i, num_frames, 1, 6, TXSign, TXExp, TXMantissa, TXManLen ) | | |
|     if ( max_depth_discontinuity_flag ) { | | |
|       max_depth_discontinuity_left[ i ] | 5 | ue(v) |
|       max_depth_discontinuity_right[ i ] | 5 | ue(v) |
|     } | | |
|   } | | |
| } | | |

Embodiment 5

In an exemplifying embodiment, Dmax_l and Dmax_r are signaled via the depth discontinuity SEI message in [1].

An exemplifying new SEI syntax is provided below, where Dmax_l and Dmax_r are called max_depth_discontinuity_left and max_depth_discontinuity_right, respectively. The changes to the current syntax are highlighted by grey color.

In this SEI message, lower_depth_discontinuity values and the ratio_depth discontinuity values are also sent. This enables the encoder to estimate a number of holes (depth discontinuities in the subsequent frames).

TABLE 5 depth_discontinuity_info SEI message syntax

| depth_discontinuity_info ( payloadSize ) { | C | Descriptor |
|---|---|---|
|   all_views_equal_flag | 5 | u(1) |
|   if( all_views_equal_flag = = 0 ) | | |
|     num_views_minus1 | 5 | ue(v) |
|     numViews = num_views_minus1 + 1 | | |
|   else | | |
|   num_frames | 5 | ue(v) |
|     numViews = 1 | | |
|   ratio_depth_discontinuity_flag | 5 | u(1) |
|   for( i = 0; i < numViews; i++ ) { | | |
|     max_depth_discontinuity_left[ i ] | 5 | u(8) |

TABLE 5-continued

| depth_discontimuity_info SEI message syntax | C | Descriptor |
|---|---|---|
| depth_discontinuity_info ( payloadSize ) { | | |
|   max_depth_discontinuity_right[ i ] | 5 | u(8) |
|   if ( ratio_depth_discontinuity_flag ) { | | |
|     lower_depth_discontinuity_left[ i ] | 5 | u(8) |
|     lower_depth_discontinuity_right[ i ] | 5 | u(8) |
|     ratio_discontinuty_left[i] | 5 | ue(v) |
|     ratio_discontinuty_right[i] | 5 | ue(v) |
|   } | | |
| } | | |
| } | | |

Embodiment 6

In an exemplifying embodiment, Dmax_l and Dmax_r is signaled via the max depth discontinuity SEI message in [1].

An exemplifying new SEI syntax is provided below where Dmax_l and Dmax_r are called max_depth_discontinuity_left and max_depth_discontinuity_right respectively. The changes to the current syntax are highlighted by grey color.

TABLE 6

| max_depth_discontimuity_info SEI message syntax | C | Descriptor |
|---|---|---|
| max_depth_discontimuity_info( payloadSize ) { | | |
|   all_views_equal_flag | 5 | u(1) |
|   if( all_views_equal_flag == 0 ) | | |
|     num_views_minus1 | 5 | ue(v) |
|     numViews = num_views_minus1 + 1 | | |
|   Else | | |
|   num_frames | 5 | ue(v) |
|     numViews = 1 | | |
|   for( i = 0; i < numViews; i++ ) { | | |
|     if ( max_depth_discontinuity_flag ) { | | |
|       max_depth_discontinuity_left[ i ] | 5 | ue(v) |
|       max_depth_discontinuity_right[ i ] | 5 | ue(v) |
|     } | | |
|   } | | |
| } | | |

Embodiment 7

In other possible exemplifying embodiments, Dmax_l and Dmax_r and possibly additional lower_depth_discontinuity values and the ratio_depth discontinuity values can be signaled via other SEI messages or by other means, e.g. in the parameter sets, such as sequences parameter set SPS or a picture parameter set PPS or in the bitstream.

Embodiment 8

Figure 9:
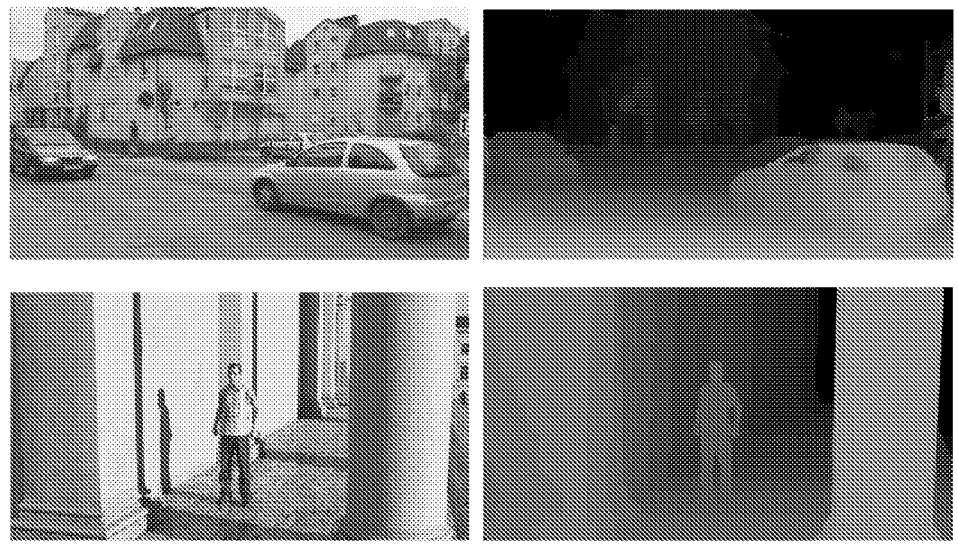
FIG. 9 shows two images/textures from a view and their corresponding depth maps. The images have been used in an evaluation project and are called "Poznan Street" (upper) and "Undo Dancer" (lower).

An illustrative example will be given below. FIG. 9 shows frames from two sequences, "Poznan Street" and "Undo Dancer", with corresponding depth maps. These sequences have been used for experiments for the 3DV standardization in MPEG.

In order to render a virtual view outside the transmitted views, holes (disocclusions) at the border of objects need to be filled. In Table Y below, four different extrapolation distances have been tested, 0.25, 0.5, 0.75 and 1 camera distances to the left of the leftmost transmitted view (coded view or input view). For each distance the maximum hole size for the whole sequence and as averaged over all frames have been determined. When a virtual view is rendered outside an outermost transmitted view, there will be a stripe of holes on one of the view borders (see FIG. 10). The best practise for a view renderer would be to crop (and resize) the view to get rid of this large hole at the border. Therefore, when determining the maximum hole sizes for the example in Table the stripe of holes at the border of the view was not considered.

TABLE 7

Maximum hole size as the maximum for the whole sequence and as averaged over all frames.

| Content | View extrapolation (in terms of camera distance) | Max hole size (for whole sequence) | Max hole size (averaged over frames) |
|---|---|---|---|
| Poznan Street | 0.25 | 17 | 7 |
| Poznan Street | 0.5 | 29 | 14 |
| Poznan Street | 0.75 | 39 | 20 |
| Poznan Street | 1 | 49 | 26 |
| Undo Dancer | 0.25 | 26 | 11 |
| Undo Dancer | 0.5 | 45 | 21 |
| Undo Dancer | 0.75 | 58 | 30 |
| Undo Dancer | 1 | 68 | 37 |

Note that a view extrapolation of 0.75 camera distances for Poznan Street has the same maximum hole size as a view extrapolation of 0.5 camera distances for Undo Dancer.

Figure 10:
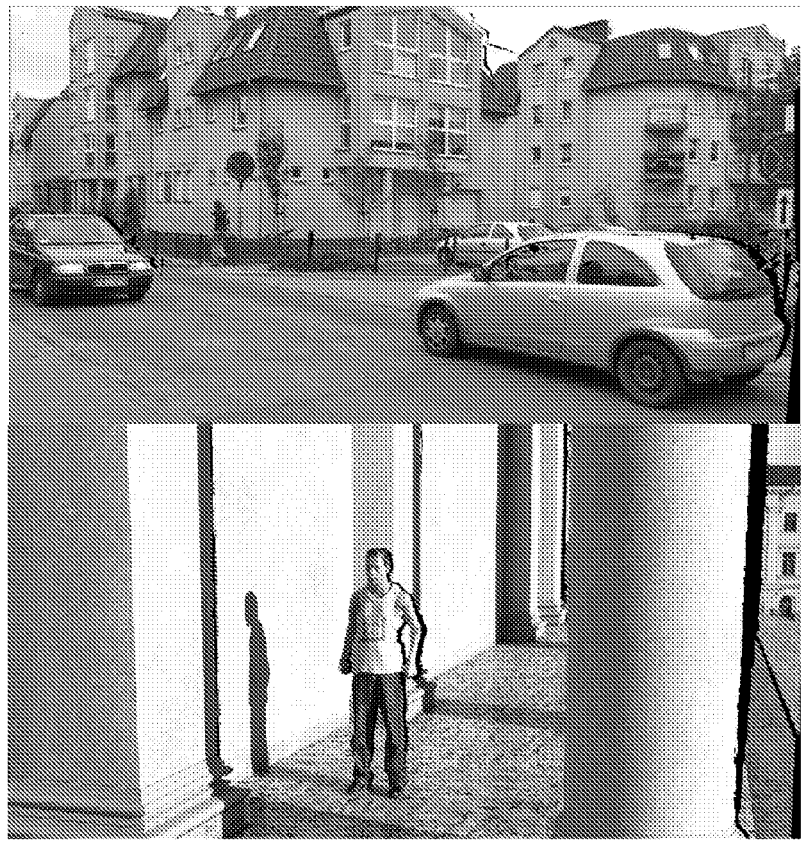
FIG. 10 shows Poznan Street and Undo Dancer, where the views have been extrapolated one camera distance to the left. No hole filling has been performed to show the sizes of the holes/disocclusions.

FIG. 10 shows the Poznan Street and the Undo Dancer sequences where the virtual view is located one camera distance to the right of the rightmost view if seen from behind the camera. To illustrate the size of the holes that need to be filled, no hole filling has been applied in the example.

Table shows the maximum depth difference for the whole sequence and as averaged over all frames. In order to avoid the misleading impact of potential fuzzy borders, the depth maps have been subsampled by a factor 16 before the maximum depth differences have been calculated.

TABLE 8

Maximum depth difference for the whole sequences and as averaged over all frames.

| Content | Max depth difference (for whole sequence) | Max depth difference (averaged over frames) |
|---|---|---|
| Poznan Street | 128 | 69 |
| Undo Dancer | 150 | 102 |

Using formula (3) the following is derived:

$$(d2-d1)=K*(v2-v1)=>$$

K=7/69=0.10 for Poznan Street with view extrapolation 0.25
K=11/102=0.11 for Undo dancer with view extrapolation 0.25
K=14/69=0.20 for Poznan Street with view extrapolation 0.5
K=21/102=0.21 for Undo dancer with view extrapolation 0.5
K=20/69=0.29 for Poznan Street with view extrapolation 0.75
K=30/102=0.29 for Undo dancer with view extrapolation 0.75
K=26/69=0.37 for Poznan Street with view extrapolation 1
K=37/102=0.36 for Undo dancer with view extrapolation 1

Thus, the example shows that the maximum hole size can consistently be derived from the maximum depth difference in practice.

Embodiment 9

The solution described herein is with advantage applicable for pre-recorded content where it is possible to look ahead at a scene to be transmitted. For each scene cut, a new depth difference value should preferably be signalled.

Embodiment 10

The solution described herein can also be used for live content where the content producer knows how the setup will be. One example could be the different camera positions during a football game. Each camera is then setup to shoot the scene at a certain distance. Another example is the setup for a 3D camera during a video conference. The camera, including the expected depth difference may be calibrated in advance, before the video conference starts.

Embodiment 11

In another exemplifying embodiment the structure of the texture around the holes to be filled are considered by the decoder or decoder arrangement, together with the maximum size of the holes to be filled.

This can be done e.g. when receiving a first image in a scene or it could be done by signaling a value from the encoder that is indicative of the complexity of the texture structure for the holes to be filled.

Description of FIGS. 11-15

Figure 11:
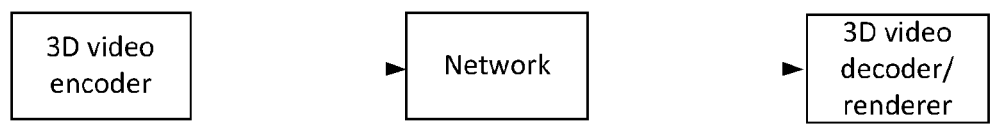
FIG. 11 illustrates an exemplifying system setup.
Figure 12:
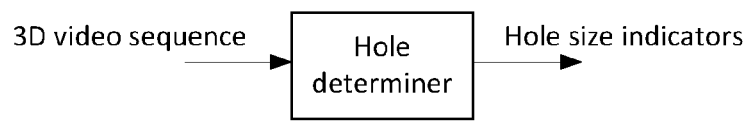
FIG. 12 illustrates an exemplifying hole determiner.

FIG. 11 illustrates an exemplifying system setup. A 3D video encoder (which has the 3D video sequence as its input, not shown in figure) encodes the 3D video sequence and sends it through a network, or storage, or alike, to a 3D video decoder and renderer. The decoder/renderer is connected to a 3D display, e.g. autosteroscopic multiview display. FIG. 12 illustrates a hole determiner which may be part of the 3D video encoder in FIG. 11. Taking the 3D video sequence, in particular depth or disparity maps, as input, it may determine the expected hole sizes, or rather, hole size indicators, such as depth differences, as discussed above. The hole size indicators may be sent together with the compressed bitstream, e.g. using a so-called SEI message.

Figure 13:
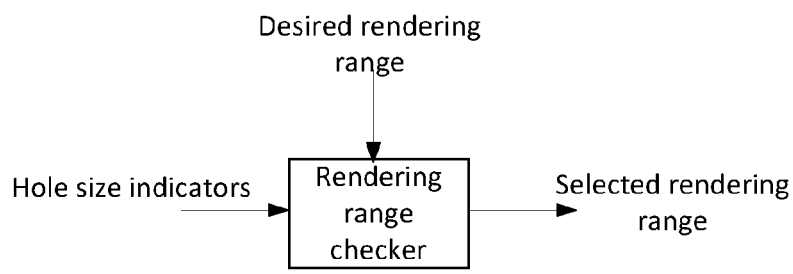
FIG. 13 illustrates an exemplifying rendering range checker.

FIG. 13 illustrates a rendering range checker, which may be part of the 3D video decoder/renderer in FIG. 11. It receives the hole size indicators, as sent, e.g. through SEI messages, and based on the desired rendering range, e.g. 4 stereo baselines for certain autostereoscopic multiview displays, or desired/necessary extrapolation distance, i.e. distance from the closest available/coded view, it may determine the expected hole size. As an additional parameter to the rendering range checker, a hole size threshold is provided (not shown in figure), which is dependent on the rendering algorithm and the expected visual impact of holes of a certain size. The rendering range checker may determine the expected hole size based on hole size indicators and extrapolation distance. It compares the expected hole size with the provided hole size threshold. If above the threshold, i.e. if the expected hole size is larger than allowed, a smaller rendering range/extrapolation range may be selected which does not violate the rendering range threshold. Alternatively, a maximum rendering range in order to keep within given hole size restrictions may be determined.

Figure 14:
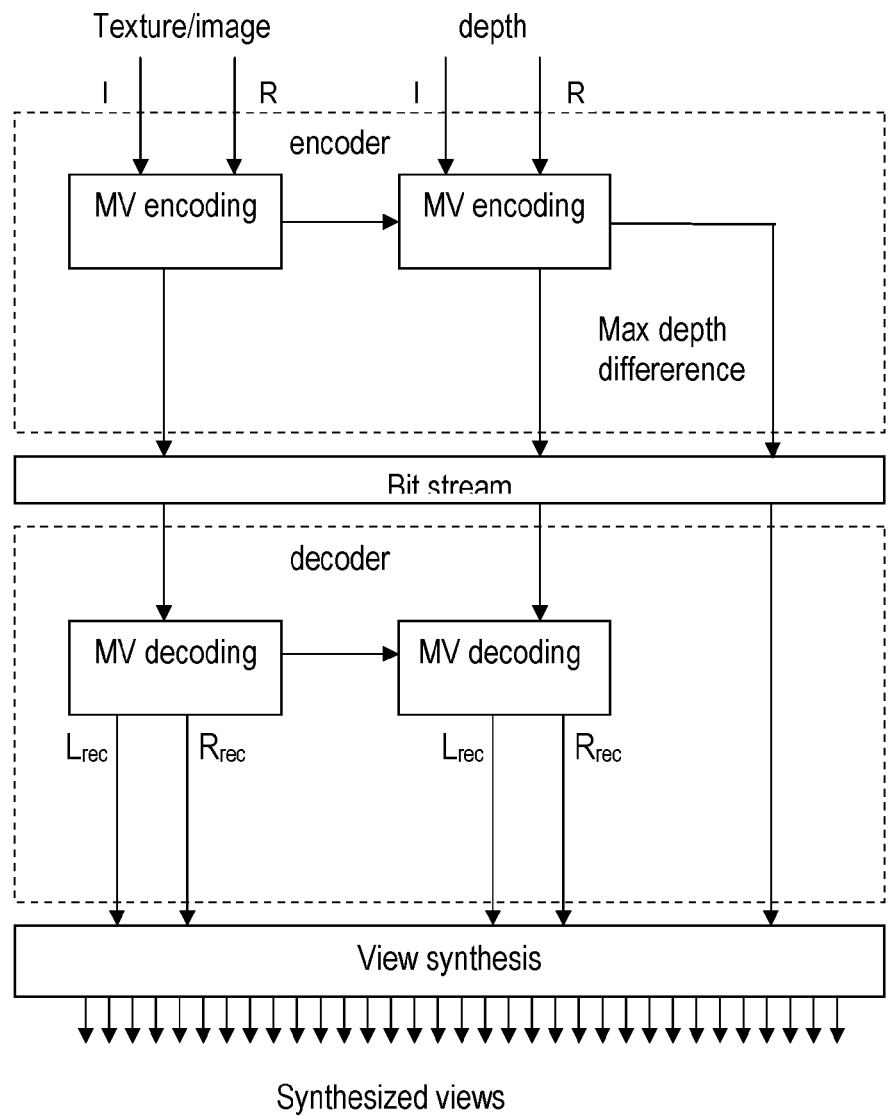
FIG. 14 illustrates a coding scheme with signaling of depth difference.

FIG. 14 describes a block diagram of an encoder and decoder, e.g. as the ones illustrated in FIG. 11, where the encoding and decoding is performed for a left and a right input view and finally virtual views are rendered by the view synthesizer. The signaling of the maximum depth difference is also illustrated. The maximum depth differences are acquired from the uncoded (or reconstructed) depth map at the encoder side and sent to the decoder side where the values are decoded and used by the view synthesizer to determine what views could be rendered with good quality.

Figure 15:
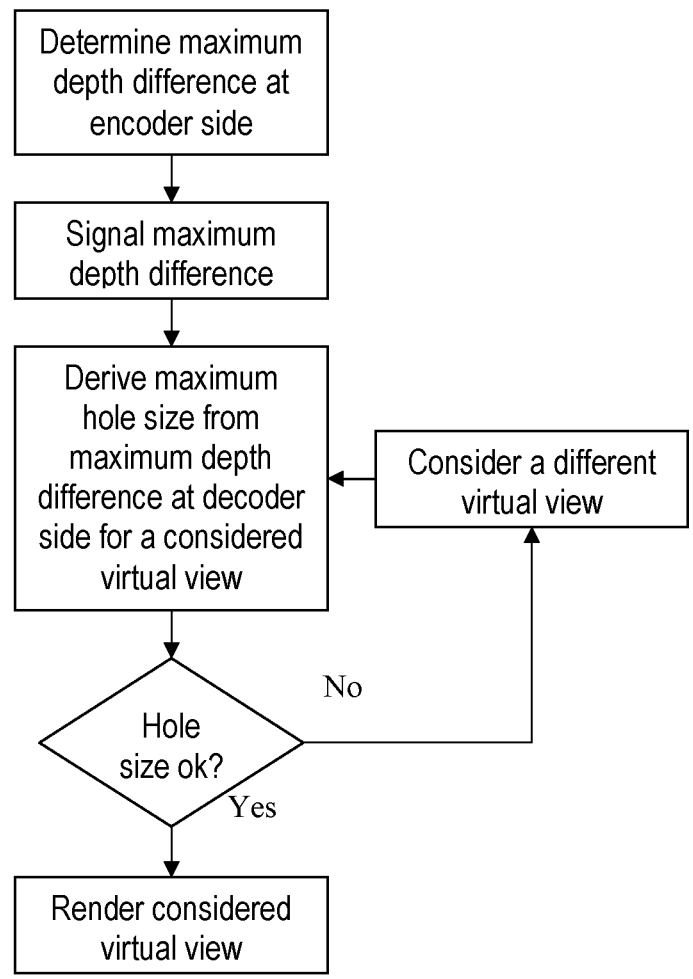
FIG. 15 is a flow chart illustrating an exemplifying embodiment of a method performed by a system, i.e. both the deriving and the use of the parameters.

FIG. 15 is a flowchart describing an exemplifying embodiment of solution described herein. The maximum depth difference is determined at the encoder side and is signaled to the decoder side. At the decoder side the maximum hole size is determined from the maximum depth difference for a considered virtual view. If the maximum hole size is sufficiently small, the considered virtual view can be rendered, otherwise a different virtual view is considered until the maximum hole size is sufficiently small.

Embodiments described herein also relate to an arrangement for supporting view synthesis. The arrangement is adapted to perform at least one embodiment of the method described above. The arrangement is associated with the same technical features, objects and advantages as the method described above and illustrated e.g. in FIGS. 1-3. The base station will be described in brief in order to avoid unnecessary repetition.

Figure 16A:
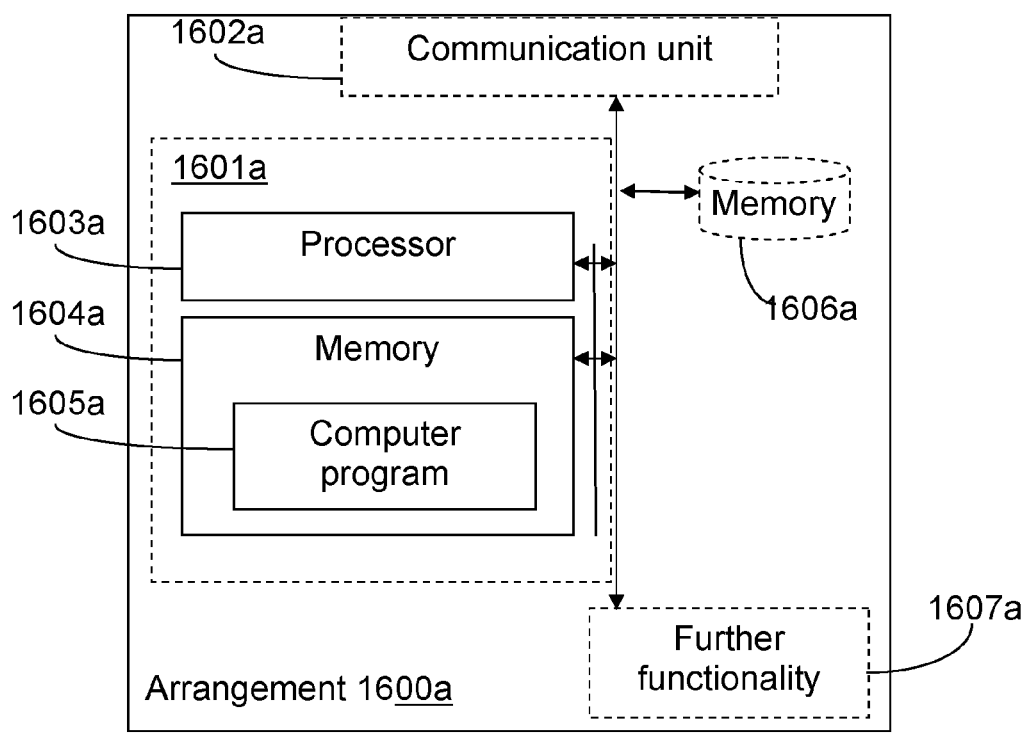
FIGS. 16a, 16b, 17a and 17b show arrangements according to exemplifying embodiments.

Below, an exemplifying arrangement 1600a, adapted to enable the performance of an above described method for supporting view synthesis will be described with reference to FIG. 16a. The part of the arrangement which is most affected by the adaptation to the herein described method is illustrated as a sub-arrangement 1601a, surrounded by a dashed line. The arrangement could be e.g. a separate entity or, a video decoder and/or a view synthesizer or part thereof. The arrangement 1600a and sub-arrangement 1601a is further illustrated as to communicate with other entities via a communication unit 1602a which may be regarded as part of the sub-arrangement 1601a. The sub-arrangement or arrangement may further comprise other functional units 1607a, such as video codecs and/or view synthesizers and renderers, and may further comprise one or more storage units 1606a.

The sub-arrangement part of the arrangement may be implemented and/or described as follows: The arrangement comprises processing means 1603a and a memory 1604a for storing instructions 1605a, the memory comprising instructions which when executed by the processing means causes the arrangement to receive 101 a measure M_D of a maximum difference in depth or disparity value between two pixels in a depth or disparity map representing the depth or disparity information of a video frame of the input view. The arrangement is further caused to determine 102 a maximal distance d_cam, from the first camera position to a second camera position, based on the received measure; and to indicate 103 the determined distance d_cam to a view synthesizer. Thereby, the view synthesizer is enabled to synthesize a view associated with a second camera position such that disocclusions due to the distance between the first and second camera position may be handled.

The memory may further comprise instructions, which, when executed by the processing means, cause the arrangement to receive 202 a rate value, representing a number of pairs of pixels, in a depth or disparity map, between which a difference in depth or disparity lies between the maximum difference M_D and a second difference S_D, which is lower than M_D, and further to determine 203 the distance d_cam based also on said rate value.

The memory may further comprise instructions, which, when executed by the processing means, cause the arrangement to receive an indication of which of the two pixels that is associated with the highest depth or disparity value.

The memory may further comprise instructions, which, when executed by the processing means, cause the arrangement to receive (301, 302) two measures M_D: M_D1, M_D2, where the first, M_D1, represents the maximum difference in depth or disparity between two pixels; and where the second, M_D2, represents the maximum difference in depth or disparity between two other pixels, where M_D1 indicates a far-to-near difference in a direction in the plane of the depth or disparity map, and M_D2 indicates a near-to-far difference in the direction in the plane of the depth or disparity map.

As previously described, the determining of the distance d_cam may further be based on a texture complexity value T_C indicative of a complexity of a texture in the video frame of the input view at a location corresponding to a location of at least one of the two pixels in the depth or disparity map.

The arrangement may comprise at least one of: a video decoder; a view synthesizer; and/or a view renderer.

Figure 16B:
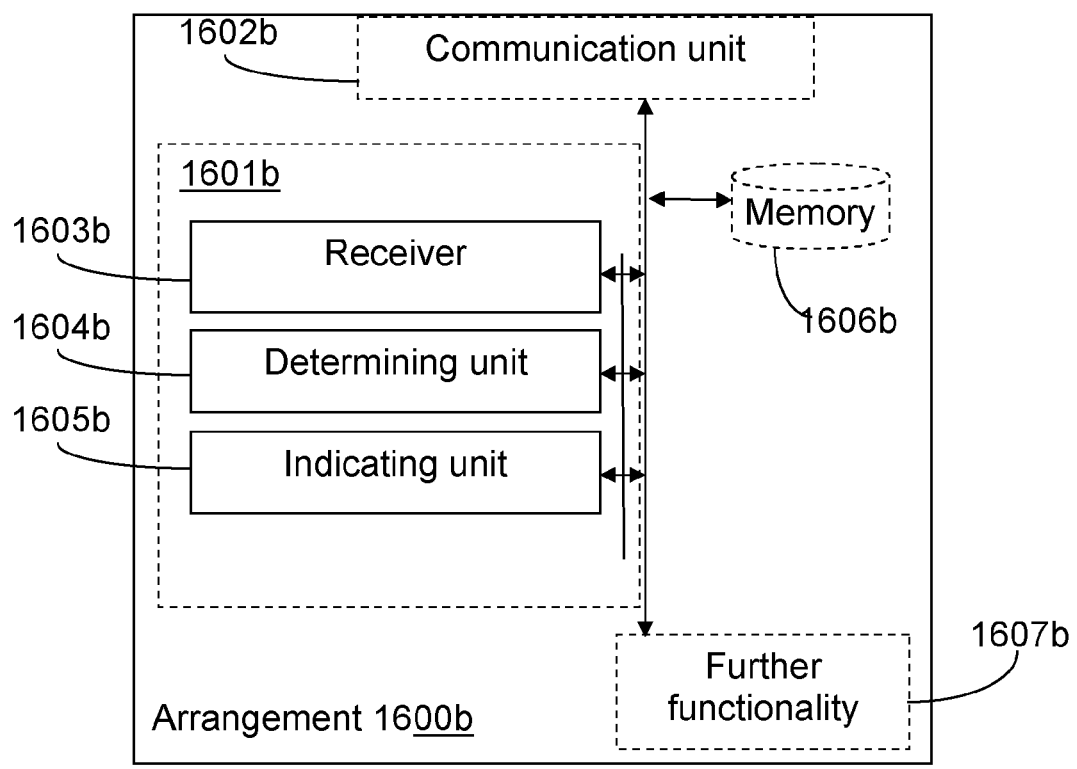

An alternative embodiment of the arrangement 1600a is shown in FIG. 16b. FIG. 16b illustrates an arrangement 1600b, operable to receive an input video stream comprising an input view associated with a first camera position. The arrangement 1600b comprises a receiver 1603b, configured to receive a measure M_D of a maximum difference in depth or disparity between two pixels in a depth or disparity map representing a video frame of the input video view. The arrangement further comprises a determining unit 1604b, configured to determine a maximal distance d_cam, from the first camera position to a second camera position, based on the received measure, and an indicating unit 1605b, adapted to indicate the determined distance d_cam to a view synthesizer,
thus enabling the view synthesizer to synthesize a view associated with a second camera position such that disocclusions due to the distance between the first and second camera position may be handled.

The sub-arrangement 1601b could be implemented e.g. by one or more of: a processor or a micro processor and adequate software and memory for storing thereof, a Programmable Logic Device (PLD) or other electronic component(s) or processing circuitry configured to perform the actions described above, and illustrated e.g. in FIGS. 1-3.

Figure 6:
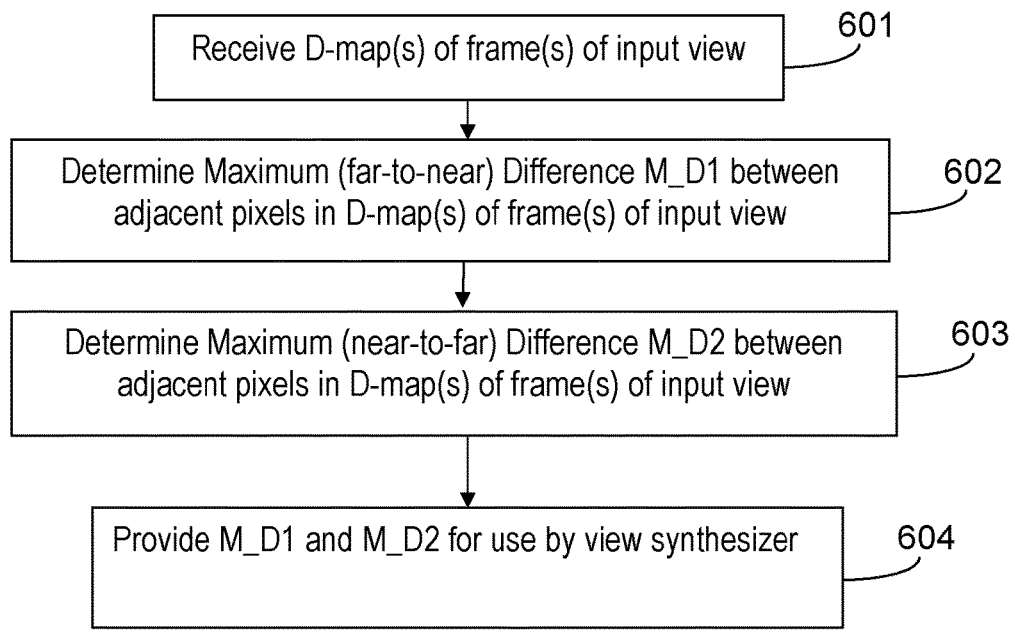
Figure 7A:
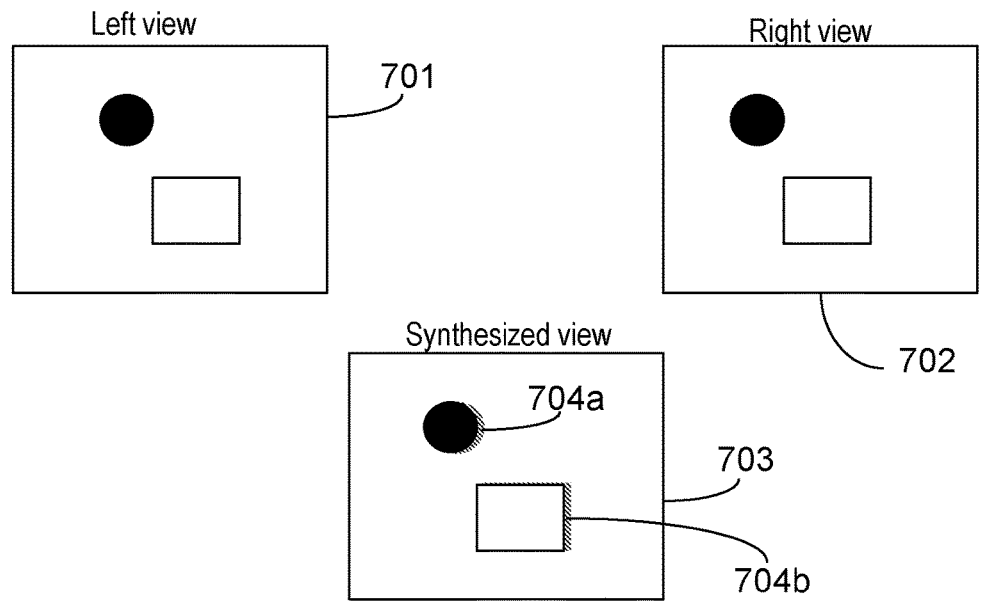
FIG. 7a illustrates a schematic synthesized view 703, which is synthesized from two other views, a left view and a right view. Areas disoccluded in the left view are marked gray in the synthesized view.
Figure 7B:
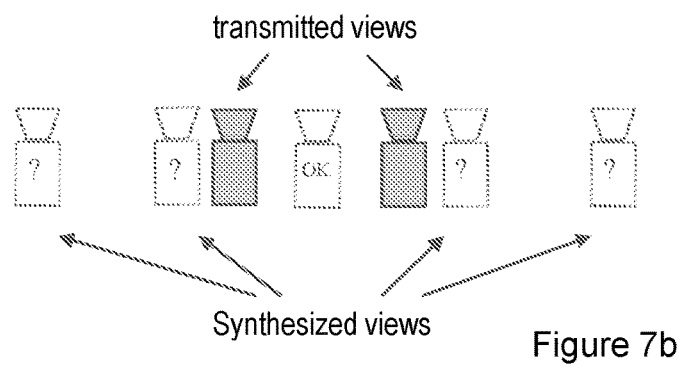
FIG. 7b illustrates that a view renderer can synthesize intermediate views with good quality, but in case of extrapolation, it is not known how far the views can be extrapolated without causing "bad" visual quality.
Figure 7C:
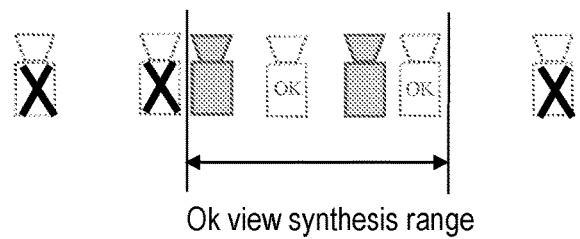
FIG. 7c illustrates how a view renderer may use received information according to an exemplifying embodiment. In this example it is determined which views, out of a set of potential synthesized views, that can be rendered with good quality.
Figure 8:
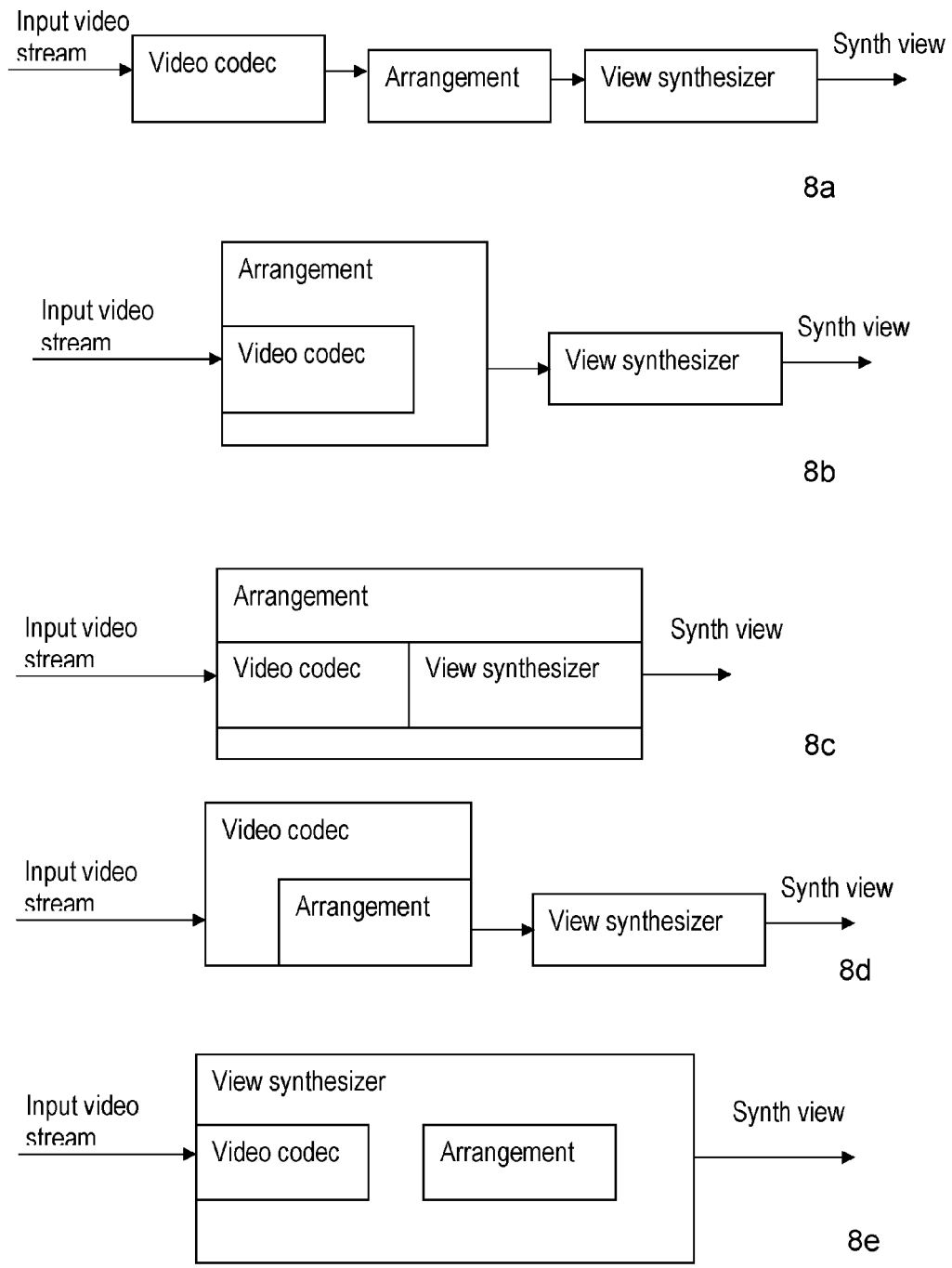
FIGS. 8a-8e illustrate different implementations of an arrangement in relation to a video codec and a view synthesizer/renderer, according to exemplifying embodiments.

Embodiments described herein also relate to another arrangement 1700a (encoder side) for supporting view synthesis. The arrangement is adapted to perform at least one embodiment of the method described above e.g. in association with FIG. 4. The arrangement is associated with the same technical features, objects and advantages as the method to be performed by an arrangement, which method is described above and illustrated e.g. in FIGS. 4-6. The arrangement will be described in brief in order to avoid unnecessary repetition.

Figure 17A:
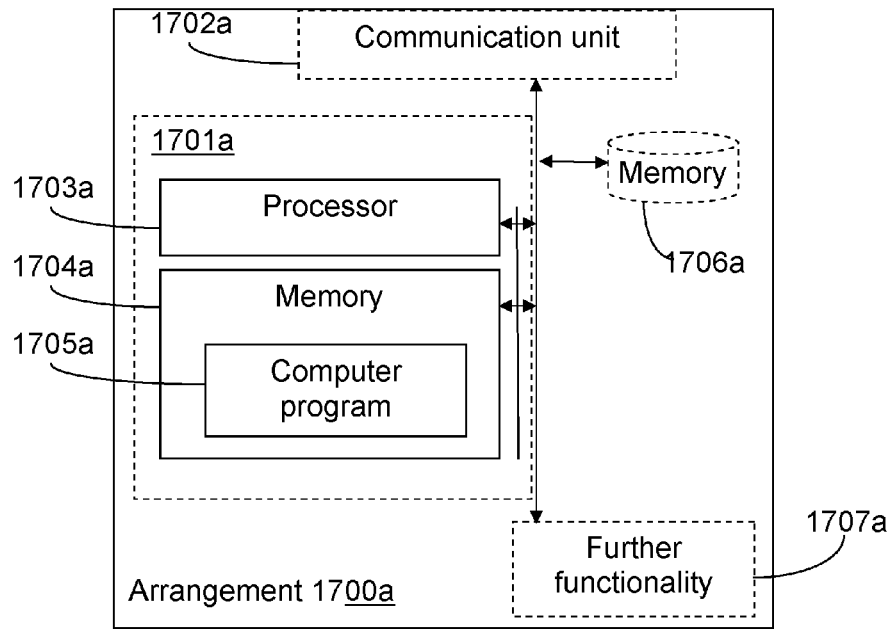

Below, an exemplifying arrangement 1700a, adapted to enable the performance of an above described method for supporting view synthesis will be described with reference to FIG. 17a. The part of the arrangement which is most affected by the adaptation to the herein described method is illustrated as a sub-arrangement 1701a, surrounded by a dashed line. The arrangement could be a separate entity or be incorporated with or comprise a video encoder. The arrangement 1700a and sub-arrangement 1701a is further illustrated as to communicate with other entities via a communication unit 1702a which may be regarded as part of the sub-arrangement 1701. The sub-arrangement or arrangement may further comprise other functional units 1707a, such as e.g. a video encoder, and may further comprise one or more storage units 1706a.

The sub-arrangement part of the arrangement may be implemented and/or described as follows:
The arrangement comprises processing means 1703a and a memory 1704a for storing instructions, the memory comprising instructions which when executed by the processing means causes the arrangement 1700a to receive 401 a depth or disparity map representing the depth or disparity information of a video frame of the input view. The arrangement is further caused to determine 402 a maximum difference M_D in depth or disparity between two pixels based on said depth or disparity map; and to provide 403 the M_D to a second arrangement. Thereby, the second arrangement, i.e. an arrangement such as 1600a or 1600b, to determine a distance d_cam, from a first camera position associated with the input view to a second camera position associated with a synthesized view, based on the received M_D.

As previously described, M_D may be determined as the maximum difference between two pixels in a plurality of depth or disparity maps associated with video frames in the input view, or as an average of a plurality of maximum differences in depth or disparity associated with a respective depth or disparity map.

The memory may further comprise instructions, which, when executed by the processing means, cause the arrangement to determine 502 a rate value R based on the depth or disparity map, said value representing a number of pairs of pixels between which a difference in depth or disparity lies between the maximum difference M_D and a second difference S_D, which is lower than M_D; and to provide 503 the determined rate value to the second arrangement.

The memory may further comprise instructions, which, when executed by the processing means, cause the arrangement to-determine which of the two pixels that is associated with the highest depth or disparity value, based on the depth or disparity map, and to provide an indication of which of the two pixels that is associated with the highest depth or disparity value to the second arrangement.

The memory may further comprise instructions, which, when executed by the processing means, cause the arrangement to determine two measures M_D: M_D1, M_D2, where M_D1 indicates a far-to-near difference in a direction in the plane of the depth or disparity map, and M_D2 indicates a near-to-far difference in the direction in the plane of the depth or disparity map, and to provide M_D by providing M_D1 and M_D2 to the second arrangement.

The memory may further comprise instructions, which, when executed by the processing means, cause the arrangement to determine a texture complexity value T_C, indicative of a complexity of a texture in the video frame of the input view at a location corresponding to a location of at least one of the two pixels in the depth or disparity map; and to provide T_C to the second arrangement.

The arrangement may comprise a video encoder.

Figure 17B:
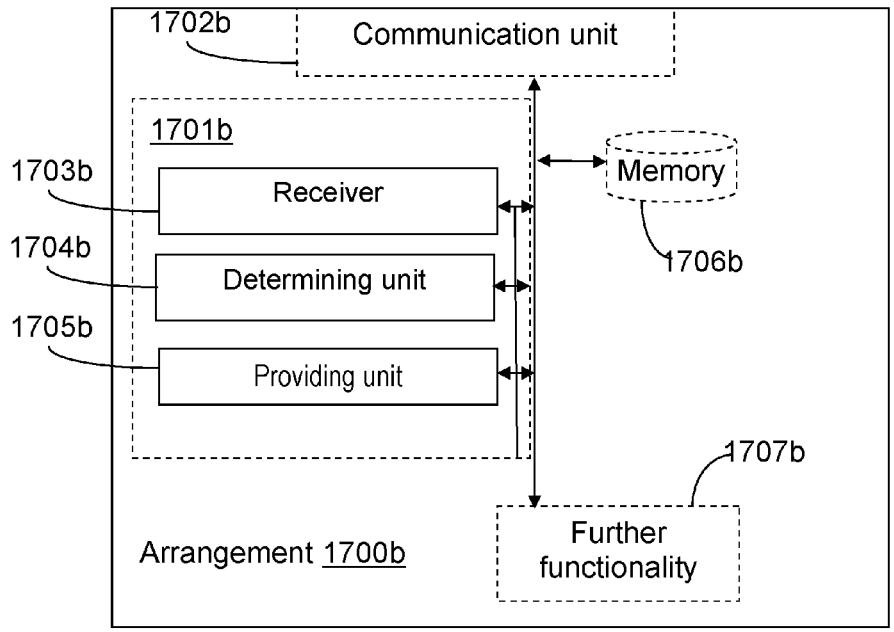

An alternative embodiment of the arrangement 1700a is shown in FIG. 17b. FIG. 17b illustrates an arrangement 1700b for supporting view synthesis, operable to receive an input video stream comprising an input view. The arrangement 1700b comprises a receiver 1703b, configured to receive a depth or disparity map representing a video frame of the input view. The arrangement further comprises a determining unit 1704b, configured to determine a maximum difference M_D in depth or disparity between two pixels based on said depth or disparity map; and further a providing unit 1705b, configured to provide M_D to a second arrangement, thus enabling the second arrangement to determine a maximal distance d_cam, from a first camera position associated with the input view to a second camera position associated with a synthesized view, based on the received M_D.

The sub-arrangement 1701b could be implemented e.g. by one or more of: a processor or a micro processor and adequate software and memory for storing thereof, a Programmable Logic Device (PLD) or other electronic component(s) or processing circuitry configured to perform the actions described above, e.g. in conjunction with FIG. 4.

Figure 18:
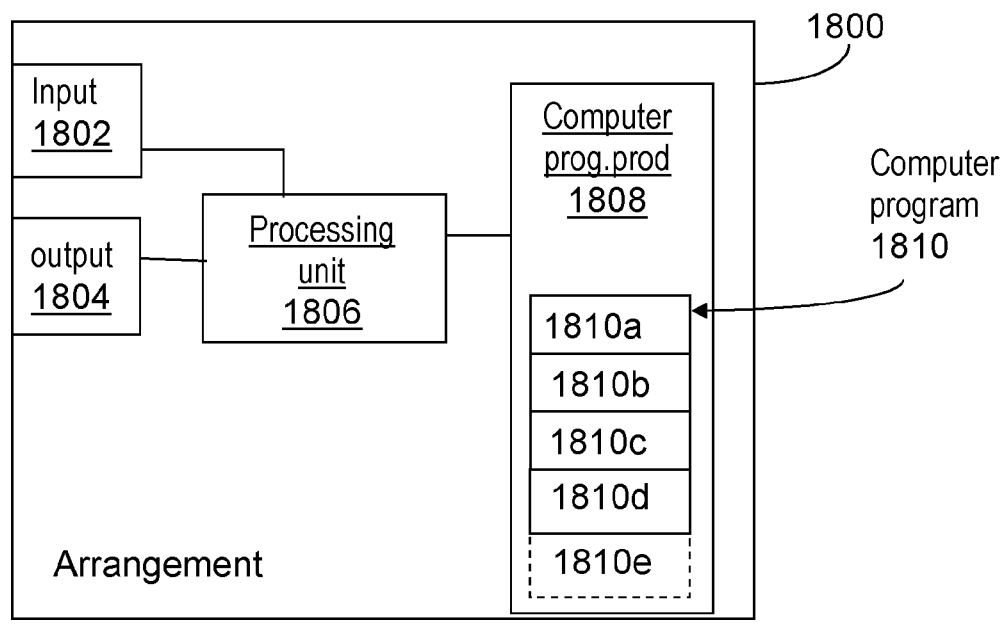
FIG. 18 shows an exemplifying computer implemented embodiment.

FIG. 18 schematically shows an embodiment of an arrangement 1800 which could be used e.g. in a view synthesizer or view renderer. Comprised in the arrangement 1800 are here a processing unit 1806, e.g. with a DSP (Digital Signal Processor). The processing unit 1806 may be a single unit or a plurality of units to perform different actions of procedures described herein. The arrangement 1800 may also comprise an input unit 1802 for receiving signals from other entities, and an output unit 1804 for providing signal(s) to other entities. The input unit and the output unit may be arranged as an integrated entity or as illustrated in the example of FIG. 18.

Furthermore, the arrangement 1800 comprises at least one computer program product 1808 in the form of a non-volatile or volatile memory, e.g. an EEPROM (Electrically Erasable Programmable Read-Only Memory), a flash memory and a hard drive. The computer program product 1808 comprises a computer program 1810, which comprises code means, which when executed in the processing unit 1806 in the arrangement 1800 causes the arrangement 1800 and/or the device in which it is comprised to perform the actions e.g. of the procedure described earlier in conjunction with FIG. 1.

The computer program 1810 may be configured as a computer program code structured in computer program modules 1810a-1810d. Hence, in an exemplifying embodiment, the code means in the computer program of the arrangement 1800 comprises a receiving module 1810a, for receiving a measure M_D of a maximum difference in depth or disparity between two pixels in a depth or disparity map representing a video frame of an input video view. The computer program may further comprise a determining module 1810b, for determining a maximal distance d_cam, from the first camera position to a second camera position, based on the received measure. The computer program further comprises an indicating module 1810c, for indicating the determined distance d_cam to a view synthesizer. The computer program may further comprise further modules, illustrated as module 1810d, e.g. for providing further processing of the input view.

The computer program modules could essentially perform the actions of the flow illustrated in FIG. 1, to emulate the sub-arrangement 1601b in FIG. 16b. In other words, when the different computer program modules are executed in the processing unit 1806, they may correspond e.g. to the units 1603b-1605b of FIG. 16b.

It is to be understood that corresponding arrangements, as the one in FIG. 18 described above, could be implemented also for a second arrangement. The structure could be the same, but the computer program modules would then be arranged to comprise code, which when executed in the processing unit would perform or trigger the performing of the actions described e.g. in conjunction with FIG. 4, 5 or 6 above.

Although the code means in the embodiments disclosed above in conjunction with FIG. 18 are implemented as computer program modules which when executed in the processing unit causes the test device to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the test device.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments.

REFERENCES

[1] T. Suzuki, M. M. Hannuksela, Y. Chen, "WD on MVC extensions for inclusion of depth maps", ISO/IEC/JTC1/SC29/WG11/N12544, Feb. 2012

The invention claimed is:

1. A method for supporting view synthesis, performed by a receiver operable to receive an input video stream comprising an input view associated with a first camera position, the method comprising:
   receiving a measure M_D of a maximum difference in depth or disparity value between two pixels in a depth or disparity map representing the depth or disparity information of a video frame of the input view, wherein the two pixels are located in the proximity of each other along an axis in the plane of the depth or disparity map, and a texture structure complexity value T_C indicative of a complexity of a texture structure in the video frame of the input view at a location corresponding to a location of at least one of the two pixels in the depth or disparity map;
   calculating a maximal distance d_cam, from the first camera position to a second camera position, based on the received M_D and T_C and data indicating a maximum disocclusion width that can be handled by a view synthesizer; and
   indicating the calculated maximal distance d_cam to the view synthesizer, to enable the view synthesizer to synthesize a view associated with a second camera position such that disocclusions due to the distance between the first and second camera position may be handled.

2. The method according to claim 1, wherein the two pixels are horizontally or vertically adjacent.

3. The method according to claim 1, wherein the received measure M_D represents the maximum value of the maximum difference in depth or disparity value between two pixels in a depth or disparity map amongst a plurality of depth or disparity maps, each depth or disparity map representing a video frame in the input view.

4. The method according to claim 1, further comprising:
calculating an average value of a number of received measures M_D related to a plurality of depth or disparity maps, each depth or disparity map representing a video frame in the input view; and
wherein calculating the maximal distance d_cam comprises calculating the maximal distance d_cam based on the calculated average value of the received measures M_D, the T_C and the data indicating the maximum disocclusion width that can be handled by the view synthesizer.

5. The method according to claim 1, further comprising:
receiving a rate value, representing a number of pairs of pixels, in a depth or disparity map, between which a difference in depth or disparity lies between the maximum difference M_D and a second difference S_D, which is lower than M_D,
wherein the calculating the maximal distance d_cam comprises calculating the maximal distance d_cam based on said rate value.

6. The method according to claim 1, further comprising:
receiving an indication of which of the two pixels that is associated with the highest depth or disparity value.

7. The method according to claim 1, wherein the calculated maximal distance d_cam is either in a positive or negative direction from the first camera position along an axis, depending on which of the two pixels that is associated with the highest depth or disparity value.

8. The method according to claim 1, where two measures M_D: M_D1, M_D2, are received, where the first, M_D1, represents the maximum difference in depth or disparity between two pixels; and where the second, M_D2, represents the maximum difference in depth or disparity between two other pixels, where M_D1 indicates a far-to-near difference in a direction in the plane of the depth or disparity map, and M_D2 indicates a near-to-far difference in the direction in the plane of the depth or disparity map.

9. The method according to claim 1, wherein the receiver comprises at least one of:
a video decoder;
a view synthesizer; and
a view renderer.

10. A method performed by a sender, for supporting view synthesis performed by a receiver, the method comprising:
receiving a depth or disparity map representing the depth or disparity information of a video frame of an input view in an input video stream;
determining a maximum difference M_D in depth or disparity between two pixels based on said depth or disparity map, wherein the two pixels are located in the proximity of each other along an axis in the plane of the depth or disparity map and a texture structure complexity value T_C indicative of a complexity of a texture structure in the video frame of the input view at a location corresponding to a location of at least one of the two pixels in the depth or disparity map; and
providing the M_D and T_C to the receiver, to enable the receiver to calculate a maximal distance d_cam, from a first camera position associated with the input view to a second camera position associated with a synthesized view, based on the received M_D and T_C and data indicating a maximum disocclusion width that can be handled by a view synthesizer.

11. The method according to claim 10, wherein the two pixels are horizontally or vertically adjacent.

12. The method according to claim 10, wherein M_D is determined as the maximum value of the maximum difference in depth or disparity value between two pixels in a depth or disparity map from amongst a plurality of depth or disparity maps, each depth or disparity map representing a video frame in the input view.

13. The method according to claim 10, wherein M_D is determined as an average value of maximum values related to a plurality of depth or disparity maps, each depth or disparity map representing a video frame in the input view.

14. The method according to claim 10, further comprising:
determining a rate value based on the depth or disparity map, said value representing a number of pairs of pixels between which a difference in depth or disparity lies between the maximum difference M_D and a second difference S_D, which is lower than M_D, and
providing the determined rate value to the receiver to enable the receiver to calculate the maximal distance d_cam based on the determined rate value.

15. The method according to claim 10, further comprising:
determining which of the two pixels that is associated with the highest depth or disparity value, based on the depth or disparity map, and
providing an indication of which of the two pixels that is associated with the highest depth or disparity value to the receiver.

16. The method according to claim 10, wherein two measures M_D: M_D1, M_D2, are determined and provided to the receiver, where the first, M_D1, represents the maximum difference in depth or disparity between two pixels; and where the second, M_D2, represents the maximum difference in depth or disparity between two other pixels, where M_D1 indicates a far-to-near difference in a direction in the plane of the depth or disparity map, and M_D2 indicates a near-to-far difference in the direction in the plane of the depth or disparity map.

17. The method according to claim 10 wherein the sender comprises a video encoder.

18. A receiver for supporting view synthesis comprising a processor and a memory comprising instructions, which when executed by the processor causes the receiver to:
receive a measure M_D of a maximum difference in depth or disparity value between two pixels in a depth or disparity map representing the depth or disparity information of a video frame of the input view, wherein the two pixels are located in the proximity of each other along an axis in the plane of the depth or disparity map, and a texture structure complexity value T_C indicative of a complexity of a texture structure in the video frame of the input view at a location corresponding to a location of at least one of the two pixels in the depth or disparity map;
calculate a maximal distance d_cam, from the first camera position to a second camera position, based on the received M_D and T_C and data indicating a maximum disocclusion width that can be handled by a view synthesizer; and
indicate the determined distance d_cam to a view synthesizer, to enable the view synthesizer to synthesize a view associated with a second camera position such that disocclusions due to the distance between the first and second camera position may be handled.

19. The receiver according to claim 18, wherein the memory further comprises instructions, which when executed by the processor causes the receiver to:
receive a rate value, representing a number of pairs of pixels, in a depth or disparity map, between which a difference in depth or disparity lies between the maximum difference M_D and a second difference S_D, which is lower than M_D, and calculate the distance d cam based also on said rate value.

20. The receiver according to claim 18, wherein the memory further comprises instructions, which when executed by the processor causes the receiver to:
receive an indication of which of the two pixels that is associated with the highest depth or disparity value.

21. The receiver according to claim 18, wherein the memory further comprises instructions, which when executed by the processor causes the receiver to:
receive two measures M_D: M_D1, M_D2, where the first, M_D1, represents the maximum difference in depth or disparity between two pixels; and where the second, M_D2, represents the maximum difference in depth or disparity between two other pixels, where M_D1 indicates a far-to-near difference in a direction in the plane of the depth or disparity map, and M_D2 indicates a near-to-far difference in the direction in the plane of the depth or disparity map.

22. The receiver according to claim 18, wherein the receiver comprises at least one of:
a video decoder;
a view synthesizer; and
a view renderer.

23. A sender for supporting view synthesis performed by a receiver, operable to receive an input video stream comprising an input view, said sender comprising a processor and a memory comprising instructions, which when executed by the processor causes the sender to:
receive a depth or disparity map representing the depth or disparity information of a video frame of the input view;
determine a maximum difference M_D in depth or disparity between two pixels based on said depth or disparity map, wherein the two pixels are located in the proximity of each other along an axis in the plane of the depth or disparity map and a texture structure complexity value T_C indicative of a complexity of a texture structure in the video frame of the input view at a location corresponding to a location of at least one of the two pixels in the depth or disparity map; and
provide the M_D and T_C to the receiver, to enable the receiver to calculate a maximal distance d_cam, from a first camera position associated with the input view to a second camera position associated with a synthesized view, based on the received M_D and T_C and data indicating a maximum disocclusion width that can be handled by a view synthesizer.

24. The sender according to claim 23, wherein M_D is determined as the maximum difference between two pixels in a plurality of depth or disparity maps associated with video frames in the input view.

25. The sender according to claim 23, wherein M_D is determined as an average of a plurality of maximum differences in depth or disparity associated with a respective depth or disparity map.

26. The sender according to claim 23, wherein the memory further comprises instructions, which when executed by the processor causes the sender to:
determine a rate value based on the depth or disparity map, said value representing a number of pairs of pixels between which a difference in depth or disparity lies between the maximum difference M_D and a second difference S_D, which is lower than M_D, and
provide the determined rate value to the receiver to enable the receiver to calculate the maximal distance d cam based on the determined rate value.

27. The sender according to claim 23, wherein the memory further comprises instructions, which when executed by the processor causes the sender to:
determine which of the two pixels that is associated with the highest depth or disparity value, based on the depth or disparity map, and
provide an indication of which of the two pixels that is associated with the highest depth or disparity value to the receiver.

28. The sender according to claim 23, wherein the memory further comprises instructions, which when executed by the processor causes the sender to:
determine two measures M_D: M_D1, M_D2, where M_D1 indicates a far-to-near difference in a direction in the plane of the depth or disparity map, and M_D2 indicates a near-to-far difference in the direction in the plane of the depth or disparity map, and
provide M_D by providing M_D1 and M_D2 to the sender.

29. The sender according to claim 23 comprising a video encoder.

30. A computer program product comprising a non-transitory computer readable medium storing computer program code which, when run on any of a video decoder, a view synthesizer, or a view renderer, arranged to support view synthesis of an input video stream comprising an input view, causes the video decoder; view synthesizer; or view renderer to:
receive a depth or disparity map representing the depth or disparity information of a video frame of the input view;
determine a maximum difference M_D in depth or disparity between two pixels based on said depth or disparity map, wherein the two pixels are located in the proximity of each other along an axis in the plane of the depth or disparity map and a texture structure complexity value T_C indicative of a complexity of a texture structure in the video frame of the input view at a location corresponding to a location of at least one of the two pixels in the depth or disparity map; and
provide the M_D and T_C to a receiver, to enable the receiver to calculate a maximal distance d_cam, from a first camera position associated with the input view to a second camera position associated with a synthesized view, based on the received M_D and T_C and data indicating a maximum disocclusion width that can be handled by a view synthesizer.

* * * * *